(12) United States Patent
Suzuki

(10) Patent No.: US 6,515,723 B1
(45) Date of Patent: Feb. 4, 2003

(54) LIQUID CRYSTAL DISPLAY DEVICE WITH FLIP-FLOP TILED PANELS

(75) Inventor: Shunji Suzuki, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 123 days.

(21) Appl. No.: 09/616,773

(22) Filed: Jul. 14, 2000

(30) Foreign Application Priority Data

Jul. 14, 1999 (JP) .......................................... 11-200929

(51) Int. Cl.⁷ .............................................. G02F 1/133
(52) U.S. Cl. .......................................... 349/73; 349/40
(58) Field of Search ..................................... 349/73, 40

(56) References Cited

U.S. PATENT DOCUMENTS 6,262,696 B1 * 7/2001 Seraphim et al. .............. 345/1

* cited by examiner

Primary Examiner—Toan Ton
Assistant Examiner—Timothy Rude
(74) Attorney, Agent, or Firm—Scully, Scott, Murphy & Presser; Marian Underweiser, Esq.

(57) ABSTRACT

The present invention solves a first problem, that the damage of the TFTs on the LCD panel of the tiling panel due to the ESD during the rubbing operation and other process, and a second problem that various kinds of lower glass substrate 1 and various kinds of upper glass substrate 2 are required to provide the tiling panel.

The present invention is more specifically directed to a liquid crystal display (LCD) device comprising: a left side LCD panel including a pixel array transparent substrate on which a pixel array and a short ring are formed, and an opposing transparent substrate on which a common electrode is formed; and a right side LCD panel including a pixel array transparent substrate on which a pixel array and a short ring extending along a top edge, a right edge and a bottom edge are formed, and an opposing transparent substrate on which a common electrode is formed; wherein one substrate of the pixel array transparent substrate and the opposing transparent substrate of the left side LCD panel is a lower substrate, and the other substrate is an upper substrate, wherein one substrate of the pixel array transparent substrate and the opposing transparent substrate of the right side LCD panel is an upper substrate, and the other substrate is a lower substrate, and wherein a right edge of the left side LCD panel is bonded to a left edge of the right side LCD panel, to bond the one substrate of the left side LCD panel and the other substrate of the right side LCD panel and to bond the other substrate of the left side LCD panel and the one substrate of the right side LCD panel.

46 Claims, 15 Drawing Sheets

[A]

[B]

[C]

[D]

→ : RUBBING DIRECTION OF ALIGNMENT LAYER 51 ON OPP. GLASS SUBSTRATE 42

⇒ : RUBBING DIRECTION OF ALIGNMENT LAYER 50 ON PIXEL ARRAY GLASS SUBSTRATE 41

[A]

[B]

[A]

[B]

[A]

RUBBING DIRECTION OF
ALIGNMENT LAYERS 50 OF
LCD PANELS A,B,C AND D

[B]

RUBBING DIRECTION OF
ALIGNMENT LAYERS 51 OF
LCD PANELS A AND D

[C]

RUBBING DIRECTION OF
ALIGNMENT LAYERS 51 OF
LCD PANELS B AND C

[A]

RUBBING DIRECTION OF ALIGNMENT LAYERS 50 OF LCD PANELS A AND D

[B]

RUBBING DIRECTION OF ALIGNMENT LAYERS 50 OF LCD PANELS B AND C

[C]

RUBBING DIRECTION OF ALIGNMENT LAYERS 51 OF LCD PANELS A AND D

[D]

RUBBING DIRECTION OF ALIGNMENT LAYERS 51 OF LCD PANELS B AND C

LIQUID CRYSTAL DISPLAY DEVICE WITH FLIP-FLOP TILED PANELS

BACKGROUND OF THE INVENTION

1. Technical Field

The present invention relates to a liquid crystal display (LCD) device. More particularly, the present invention relates to an LCD device including a tiling panel in which a plurality of discrete LCD panels are bonded together to form a large size display screen.

2. Prior Art

An LCD device using a tiling panel has been developed, in which a plurality of discrete LCD panels, such as four discrete LCD panels A, B, C and D, are bonded together along a bonding region 19 to form the 2 (rows) 2 (columns) system, as shown in FIG. 1. Other systems, such as 1 2 system, 2 1 system, etc. can be formed. A cross point of the vertical bonding region 19 and the horizontal bonding region 19 is called a center point (CT) of the tiling panel, in this specification. FIG. 2 shows an arrangement of pixel regions of the panels A, B, C and D. Each of the panels A, B, C and D includes a lower glass substrate 1 and an upper glass substrate 2. It is assumed that a width of a black matrix disposed between the adjacent two pixel regions in the horizontal direction is LH, and a width of the black matrix disposed between the adjacent two pixel regions in the vertical direction is LV. To realize the natural and continuous image across the bonding regions 19, the distance between the pixel region PMN at the most lower right position of the panel A and the pixel region PM1 at the most lower left position of the panel B, and the distance between the pixel region P1N at the most upper right position of the panel D and the pixel region P11 at the most upper left position of the panel C should be the distance represented by 2L1+LB, wherein the L1<LH/2, and LB is the width of the bonding region 19. Further, the distance between the pixel region PMN of the panel A and the pixel region PIN of the panel D, and the distance between the pixel region PM1 of the panel B and the pixel region P11 of the panel C should be the distance represented by 2L2+LB, wherein the L2<LV/2. Sealing regions 8, later described, are shown by the dashed line in the FIG. 2.

Describing a structure of one LCD panel, such as the LCD panel A, used for the tiling panel, with reference to FIG. 3. The FIG. 3 shows the structure on the lower glass substrate 1 and the upper glass substrate 2 of the panel A. On the surface of the lower glass substrate 1, a plurality of data lines DL1 through DLN are formed along the vertical direction, a plurality of gate lines GL1 through GLM are formed along the horizontal direction, one pixel region including a thin film transistor (TFT) 3 and the pixel electrode 4 defining one pixel (P) is formed at each of the cross points of the data lines and the gate lines, an outer short ring 5 and an inner short ring 6 made of an electrically conductive material are formed, and an alignment layer made of polyimide, not shown in the FIGS. 1 and 2 are formed on the short rings. The arrangement of the liquid crystal molecules is decided by a rubbing direction on the surface of the alignment layer, in the rubbing process. On the surface of the upper glass substrate 2, a common electrode and the alignment layer, not shown in the FIGS. 1 and 2 are formed. In the case of a color LCD device, color filters, i.e. Red color filters, Green color filters and Blue color filters, and a rubbing layer are formed on the upper glass substrate.

At the completion of the lower glass substrate 1, both the outer and inner short rings 5 and 6 are formed. The lower glass substrate 1 is cut along cutting lines 9A through 9D, so that the outer short ring 5 and the right side portion and the lower portion of the inner short ring 6 are removed. Before the cutting process, the outer short ring 5 is connected to a potential level corresponding to the potential level of the common electrode. The outer short ring 5 is connected to the inner short ring 6 through resistive element 7. Each of the data lines DL1 through DLN is connected to the outer short ring 5 and the inner short ring 6 through the resistive element 7, respectively, and each of the gate lines GL1 through GLM is connected to the outer short ring 5 and the inner short ring 6 through the resistive element 7, respectively. The purpose of the outer and inner short rings 5 and 6 is to prevent the TFT 3 of the pixel region from being damaged by electrostatic discharge (ESD) during the fabrication of the LCD panel, in the following manner. A resistive value of the resistive element 7, such as a TFT operating as a diode, is designed to be lower than a resistive value of the TFT 3 of the pixel region. When the electrostatic charges are applied to the gate lines, for example, during the handling of the lower glass substrate 1, the resistive element 7 connected between the gate lines and the short ring 6, and the resistive element 7 connected between the short ring 8 and the data lines conduct, whereby the electric potential level at the gate lines becomes equal to the electric potential at the data lines, and no voltage is applied between the drain and gate electrodes of the TFT 3 of the pixel region. After the cutting of the lower glass substrate 1 and the assemble of the upper glass substrate 2 on the lower glass substrate 1, the inner short ring 6 is connected to the common electrode on the upper glass substrate 2, so that when the electrostatic charges are applied to the gate line(s) or the data line(s), the resistive elements 7 conduct to pass the electrostatic charges to the common electrode through the inner ring 6, resulting that the electric potential level at the lower glass substrate 1 becomes equal to the electric potential of the common electrode on at the upper glass substrate 2, and no voltage is applied to the TFT 3 of the pixel region.

The lower glass substrate 1 and the upper glass substrate 2 are sealed along the sealing region 8 to complete the panel A, as well known in the art. Describing the formation of the sealing region 8 of the panel A with reference to the FIG. 2, the right side portion of the sealing region 8 is formed adjacent to the pixel regions of the right most data line DLN, and the lower side portion of the sealing region 8 is formed adjacent to the pixel regions of the lower most gate line GLM, to provide the distance Li and the distance L2 (FIG. 2), respectively after the cutting process. It is required to provide the positional relationship of the pixel regions on the LCD panels A, B, C and D, as shown in the FIG. 2. For this reason, the right side and lower side portions of the sealing region 8 are formed inside of the inner short ring 6. After the sealing process, the LCD panel A is cut along the four cutting lines 9A, 9B, 9C and 9D. A typical width W1 of the sealing region 8 is about 500 through 100 m, and the width W2 of the sealing area 8 remaining along the cutting lines 9B and 9D is about 50 through 100 m. Therefore, the LCD panel A includes the short ring 6 along the upper side and the left side, and does not include the short ring 6 along the right side and the lower side. Circuit modules 12, such as data line drivers, are connected to the data lines, which are exposed in an upper side area 10 (FIG. 3), and circuit modules 13, such as gate line drivers, are connected to the gate lines, which are exposed on a left side area 11 (FIG. 3), as shown in the FIGS. 1 and 3.

In a similar manner as the LCD panel A, the LCD panels B, C and D are formed by changing the position of the cutting lines. FIG. 4 shows a cross section of the LCD panel A and a portion of the LCD panel B along a line 14—14 in the FIG. 1. The left side sealing region 8 has the width W1, and the right side sealing region 8 has the width W2. The pixel regions, each of which includes the TFT 3 and the pixel electrode, the data lines and the gate lines are represented as a layer 15 on the lower glass substrate 1, and an alignment layer 17 is formed on the layer 15. The color filters are represented as a layer 16 on the upper glass substrate 2, and an alignment layer 18 is formed on the layer 16. The left side short ring 6 is shown adjacent to the left side sealing region 8. The circuit module 13 is connected to the gate lines GL extending from the layer 15. The space enclosed by the sealing region 8 and the two alignment layers 17 and 18 is filled with the nematic liquid crystal material to form the twisted nematic mode. The LCD panel A and the LCD panel B are bonded by the bonding region 19.

The four LCD panels A, B, C and D constitutes one LCD display screen, and the data line drivers 12 of the four LCD panels and the gate line drivers 13 of the four LCD panels are controlled to display the image on the four LCD panels.

It is required that all the four LCD panels A, B, C and D have the same display characteristic, i.e. as a wide viewing angle providing a good contrast ratio. The FIG. 5 shows the viewing direction L and U with respect to a line 20 vertical to the surface of the LCD device. The user usually sees the LCD device along a lower side direction L, and hence, the rubbing direction of the alignment layer of the four LCD panels A, B, C and D, as shown in the FIG. 1 have been used to realize the wide viewing angle L providing the good contrast ratio in the lower side direction. In the FIG. 1, an arrow with double dotted line indicates the rubbing direction of the alignment layer 17 (FIG. 4) on the lower glass substrate 1, and an arrow with a single solid line indicates the rubbing direction of the alignment layer 18 (FIG. 4) of the upper glass substrate 2.

The reasons for selecting the rubbing direction, as shown in the FIG. 1 is described with reference to the FIG. 5(B), (C) and (D). When the surface of the alignment layer is rubbed by a rotated roller 21 moved in the direction of the arrow 22, each of the liquid crystal molecules are tilted, as shown in the FIG. 5(B). That is, one end of the liquid crystal molecule at the upper stream side of the rubbing direction contacts to the alignment layer, and the other end at the lower stream side of the rubbing direction separates from the surface of the alignment layer. The angle between the liquid crystal molecule and the surface of the alignment layer is called as a pretilt angle. To realize the wide viewing angle providing the good contrast ratio in the lower side direction L, the alignment layers 17 of the lower glass substrate 1 of all the four LCD panels A, B, C and D are rubbed in the direction of an arrow 24, and the alignment layer 18 of the upper glass substrate 2 of all the four LCD panels are rubbed in the direction of an arrow 25. It is noted that the rubbing directions of the arrows 24 and 25 are the direction which is observed through the upper glass substrate 2 in a direction of an arrow 32 in the FIG. 4. Due to the above described rubbing direction, one end 28 of the liquid crystal molecule 26 contacts to the upper alignment layer 18, and one end 29 of the liquid crystal molecule 27 contacts to the lower alignment layer 17, as shown in the FIG. 5(D). In the case that such rubbing directions are used, a chiral material causing the liquid crystal molecules to rotate in the counter clock wise direction is used. Therefore, the liquid crystal molecules 26 and 27 shown in the FIG. 5(D) tend to rotate in the counter clockwise direction when the voltage is applied across the pixel electrode on the lower glass substrate 1 and the common electrode on the upper glass substrate 2. It means that the user sees the liquid crystal molecule 26 in a direction of an arrow 23 which is an axial direction of the liquid crystal molecule 26. The wide viewing angle providing the good contrast ratio is obtained when user sees the light in the direction of the arrow 23.

For the above reason, the same rubbing direction, i.e. the direction from the upper left region to the lower right region, is used in the alignment layers 17 of the lower glass substrate 1 of all the four LCD panels A, B, C and D. But, this arrangement of the rubbing direction causes the following two problems. The first problem is that the TFTs 3 of the pixel regions on the LCD panel C is damaged by the ESD (electrostatic discharge) during the rubbing process since the inner short ring 6 is removed from the upper edge and the left edge of the LCD panel C. More particularly, when the rubbing roller 21, shown in the FIG. 5(B) initially touches the surface of the alignment layer of the LCD panel C at the upper left corner, the electrostatic charges are applied to the data lines or the gate lines, so that the TFTs of the pixel regions are damaged. In contradistinction, the LCD panel A has the short ring 6 formed along the upper edge and the left edge, so that the electrostatic charges applied from the rubbing roller 21 can be guided to the short ring 6, which is connected to the common electrode potential, whereby the TFTs of the pixel regions on the LCD panel A are protected from the ESD. The LCD panel B has the short ring 6 formed along the upper edge and the right edge, and the LCD panel D has the short ring 6 formed along the left edge and the bottom edge, so that the electrostatic charges applied from the rubbing roller 21 can be guided to the short ring 6, whereby the TFTs of the pixel regions on the LCD panels B and D can be protected from the ESD.

The second problem is that two kinds of lower glass substrate 1 and various kinds of the rubbing direction on the upper glass substrate 2 are required to form the tiling panel shown in the FIG. 1. The second problem is described with reference to FIG. 6. The FIG. 6 shows the rubbing direction of the alignment layers 17 on the inside surface of the lower glass substrate 1 when the alignment layer 17 is viewed in a direction of an arrow 30 in the FIG. 4, and the rubbing direction of the alignment layer 18 on the inside surface of the upper glass substrate 2 when the alignment layer 18 is viewed in a direction of an arrow 31 in the FIG. 4. To assist the understanding of that the various kind of lower glass substrate 1 are required, the lower glass substrates 1 of all the four panels are so shown in the FIG. 6 that the long edges including the center point CT are at the lower side. As described before, the CT represents the center point of the tiling panel, and is shown as a reference point for assisting the understanding of the positional relationship of the lower glass panel 1 and the upper glass panel 2. To assemble each panel, the lower glass substrate 1 and the upper glass substrate 2 are faced to align the CT of the substrate 1 to the CT of the substrate 2. For example, in the panel A, if the substrate 1 and 2 are faced each other to align the CT of the substrate 1 to the CT of the substrate 2, the rubbing direction of the panel A shown in the FIG. 1, which is observed in the direction 32 shown in the FIG. 4 is obtained. Paying attention to the structure of the lower glass substrate 1 when the rubbing direction is ignored, the lower glass substrates 1 of the panels A and C are the same, and the lower glass substrates 1 of the panels B and D are the same. But, the rubbing direction of the panels A and C are opposite to each other, and the rubbing direction of the panels B and D are opposite to each other. With respect to the upper glass substrates 2, the rubbing direction of the panels A and C are opposite to each other, and the rubbing direction of the panels B and D are opposite to each other. In this manner, the various kinds of lower glass substrate 1 and various kinds of upper glass substrate 2 are required to form the tiling panel shown in the FIG. 1.

SUMMARY OF THE INVENTION

A liquid crystal display (LCD) device in accordance with the present invention comprises:

a left side LCD panel including a pixel array substrate on which a pixel array and a short ring are formed, and an opposing substrate on which a common electrode is formed; and a right side LCD panel including a pixel array substrate on which a pixel array and a short ring are formed, and an opposing substrate on which a common electrode is formed;

wherein one substrate of the pixel array substrate and the opposing substrate of the left side LCD panel is a lower substrate, and the other substrate is an upper substrate, wherein one substrate of the pixel array substrate and the opposing substrate of the right side LCD panel is an upper substrate, and the other substrate is a lower substrate, and wherein said one substrate of said left side LCD panel is the pixel array substrate if said one substrate of said right side LCD panel is the opposing substrate, and conversely said one substrate of said left side LCD panel is the opposing substrate if said one substrate of said right side LCD panel is the pixel array substrate;

wherein a right edge of the left side LCD panel is bonded to a left edge of the right side LCD panel, to bond the one substrate of the left side LCD panel and the other substrate of the right side LCD panel and to bond the other substrate of the left side LCD panel and the one substrate of the right side LCD panel.

The short ring on the pixel array substrate of the left side LCD panel extends along a left edge and at least one of a top edge and a bottom edge, the short ring on the pixel array substrate of the right side LCD panel extends along a right edge and at least one of a top edge and a bottom edge, each of the pixel arrays in the left side LCD panel and the right side LCD panel includes gate lines extending in parallel to the top or bottom edge, data lines extending in parallel to the left or right edge, and a pixel region formed at each of cross points of the gate lines and the data lines, data line drivers are connected to the data lines on an area of the left side LCD panel adjacent to at least one of the top edge and the bottom edge, and gate line drivers are connected to the gate lines on an area of the left side LCD panel adjacent to the left edge, and data line drivers are connected to the data lines on an area of the right side LCD panel adjacent to at least one of the top edge and the bottom edge, and gate line drivers are connected to the gate lines on an area of the right side LCD panel adjacent to the right edge.

A LCD device in accordance with the present invention comprises:

an upper side LCD panel including a pixel array substrate on which a pixel array and a short ring are formed, and an opposing substrate on which a common electrode is formed; and a lower side LCD panel including a pixel array substrate on which a pixel array and a short ring are formed, and an opposing substrate on which a common electrode is formed;

wherein one substrate of the pixel array substrate and the opposing substrate of the upper side LCD panel is a lower substrate, and the other substrate is an upper substrate, wherein one substrate of the pixel array substrate and the opposing substrate of the lower side LCD panel is an upper substrate, and the other substrate is a lower substrate, and wherein said one substrate of said upper side LCD panel is the pixel array substrate if said one substrate of said lower side LCD panel is the opposing substrate, and conversely said one substrate of said upper side LCD panel is the opposing substrate if said one substrate of said lower side LCD panel is the pixel array substrate;

wherein a bottom edge of the upper side LCD panel is bonded to a top edge of the lower side LCD panel, to bond the one substrate of the upper side LCD panel and the other substrate of the lower side LCD panel and to bond the other substrate of the upper side LCD panel and the one substrate of the lower side LCD panel.

The short ring on the pixel array substrate of the upper side LCD panel extends along a top edge and at least one of a left edge and a right edge, the short ring on the pixel array substrate of the lower side LCD panel extends along a bottom edge and at least one of a left edge and a right edge, each of the pixel arrays in the upper side LCD panel and the lower side LCD panel includes gate lines extending in parallel to the top or bottom edge, data lines extending in parallel to the left or right edge, and a pixel region formed at each of cross points of the gate lines and the data lines, data line drivers are connected to the data lines on an area of the upper side LCD panel adjacent to the top edge, and gate line drivers are connected to the gate lines on an area of the upper side LCD panel adjacent to at least one of the left edge and the right edge, and data line drivers are connected to the data lines on an area of the lower side LCD panel adjacent to the bottom edge, and gate line drivers are connected to the gate lines on an area of the lower side LCD panel adjacent to at least one of the left edge and the right edge.

A LCD device in accordance with the present invention comprises:

an upper left side LCD panel including a pixel array substrate on which a pixel array, and a short ring extending along a top edge and a left edge are formed, and an opposing substrate on which a common electrode is formed;

an upper right side LCD panel including a pixel array substrate on which a pixel array, and a short ring extending along a top edge and a right edge are formed, and an opposing substrate on which a common electrode is formed;

a lower right side LCD panel including a pixel array substrate on which a pixel array, and a short ring extending along a bottom edge and a right edge are formed, and an opposing substrate on which a common electrode is formed; cand a lower left side LCD panel including a pixel array substrate on which a pixel array, and a short ring extending along a bottom edge and a left edge are formed, and an opposing substrate on which a common electrode is formed;

wherein one substrate of the pixel array substrate and the opposing substrate of the upper left side LCD panel is a lower substrate, and the other substrate is an upper substrate, wherein one substrate of the pixel array substrate and the opposing substrate of the upper right side LCD panel is an upper substrate, and the other substrate is a lower substrate, wherein said one substrate of said upper left side LCD panel is the pixel array substrate if said one substrate of said upper right side LCD panel is the opposing substrate, and conversely said one substrate of said upper left side LCD panel is the opposing substrate if said one substrate of said upper right side LCD panel is the pixel array substrate;

wherein one substrate of the pixel array substrate and the opposing substrate of the lower right side LCD panel is a lower substrate, and the other substrate is an upper substrate, wherein one substrate of the pixel array substrate and the opposing substrate of the lower left side LCD panel is an upper substrate, and the other substrate is a lower substrate, wherein said one substrate of said lower right side LCD panel is the pixel array substrate if said one substrate of said lower left side LCD panel is the opposing substrate, and conversely said one substrate of said lower right side LCD panel is the opposing substrate if said one substrate of said lower left side LCD panel is the pixel array substrate;

wherein a right edge of the upper left side LCD panel is bonded to a left edge of the upper right side LCD panel, to bond the one substrate of the upper left side LCD panel and the other substrate of the upper right side LCD panel and to bond the other substrate of the upper left side LCD panel and the one substrate of the upper right side LCD panel, wherein a bottom edge of the upper right side LCD panel is bonded to a top edge of the lower right side LCD panel, to bond the one substrate of the upper right side LCD panel and the other substrate of the lower right side LCD panel and to bond the other substrate of the upper right side LCD panel and the one substrate of the lower right side LCD panel, wherein a left edge of the lower right side LCD panel is bonded to a right edge of the lower left side LCD panel, to bond the one substrate of the lower right side LCD panel and the other substrate of the lower left side LCD panel and to bond the other substrate of the lower right side LCD panel and the one substrate of the lower left side LCD panel, and wherein a top edge of the lower left side LCD panel is bonded to a bottom edge of the upper left side LCD panel, to bond the one substrate of the lower right side LCD panel and the other substrate of the upper left side LCD panel and to bond the other substrate of the lower left side LCD panel and the one substrate of the upper left side LCD panel.

Each of the pixel arrays in the upper left side LCD panel, the upper right side LCD panel, the lower left side LCD panel and the lower left side LCD panel includes gate lines extending in parallel to the top or bottom edge, data lines extending in parallel to the left or right edge, and a pixel region formed at each of cross points of the gate lines and the data lines, data line drivers are connected to the data lines on an area of the upper left side LCD panel adjacent to the top edge, and gate line drivers are connected to the gate lines on an area of the upper left side LCD panel adjacent to the left edge, data line drivers are connected to the data lines on an area of the upper right side LCD panel adjacent to the top edge, and gate line drivers are connected to the gate lines on an area of the upper right side LCD panel adjacent to the right edge, data line drivers are connected to the data lines on an area of the lower right side LCD panel adjacent to the bottom edge, and gate line drivers are connected to the gate lines on an area of the lower right side LCD panel adjacent to the right edge, and data line drivers are connected to the data lines on an area of the lower left side LCD panel adjacent to the bottom edge, and gate line drivers are connected to the gate lines on an area of the lower left side LCD panel adjacent to the left edge.

A LCD device in accordance with the present invention comprises:

a left side LCD panel including a pixel array substrate on which a pixel array, a short ring and an alignment layer are formed, and an opposing transparent glass substrate on which a common electrode and an alignment layer are formed; and a right side LCD panel including a pixel array substrate on which a pixel array, a short ring and an alignment layer are formed, and an opposing transparent substrate on which a common electrode and an alignment layer are formed;

wherein one substrate of the pixel array substrate and the opposing substrate of the left side LCD panel is a lower substrate, and the other substrate is an upper substrate, wherein one substrate of the pixel array substrate and the opposing substrate of the right side LCD panel is an upper substrate, and the other substrate is a lower substrate, wherein a right edge of the left side LCD panel is bonded to a left edge of the right side LCD panel, to bond the one substrate of the left side LCD panel and the other substrate of the right side LCD panel and to bond the other substrate of the left side LCD panel and the one substrate of the right side LCD panel, wherein the alignment layer on the pixel array substrate of the left side LCD panel is rubbed in a direction from an upper left region to a lower right region of the left side LCD panel, and the alignment layer on the opposing substrate of the left side LCD panel is rubbed in a direction from a lower left region to an upper right region, and wherein the alignment layer on the pixel array substrate of the right side LCD panel is rubbed in a direction from an upper right region to a lower left region of the right side LCD panel, and the alignment layer on the opposing substrate of the right side LCD panel is rubbed in a direction from a lower right region to an upper left region.

A LCD device in accordance with the present invention comprises:

a left side LCD panel including a pixel array substrate on which a pixel array, a short ring and an alignment layer are formed, and an opposing transparent glass substrate on which a common electrode and an alignment layer are formed; and a right side LCD panel including a pixel array substrate on which a pixel array, a short ring and an alignment layer are formed, and an opposing transparent substrate on which a common electrode and an alignment layer are formed;

wherein one substrate of the pixel array substrate and the opposing substrate of the left side LCD panel is a lower substrate, and the other substrate is an upper substrate, wherein one substrate of the pixel array substrate and the opposing substrate of the right side LCD panel is an upper substrate, and the other substrate is a lower substrate, wherein a right edge of the left side LCD panel is bonded to a left edge of the right side LCD panel, to bond the one substrate of the left side LCD panel and the other substrate of the right side LCD panel and to bond the other substrate of the left side LCD panel and the one substrate of the right side LCD panel, wherein the alignment layer on the pixel array substrate of the left side LCD panel is rubbed in a direction from a lower right region to an upper left region of the left side LCD panel, and the alignment layer on the opposing substrate of the left side LCD panel is rubbed in a direction from an upper right region to a lower left region, and wherein the alignment layer on the pixel array substrate of the right side LCD panel is rubbed in a direction from an upper right region to a lower left region of the right side LCD panel, and the alignment layer on the opposing substrate of the right side LCD panel is rubbed in a direction from a lower right region to an upper left region.

A liquid crystal material in the left side LCD panel and the right side LCD panel is a nematic liquid crystal material with a chiral material causing liquid molecules to twist in a counter clockwise direction.

A color filter is formed on the opposing substrates of the left side LCD panel and the right side LCD panel.

A light source is mounted to direct the light to the lower substrates of the right side LCD panel and the left side LCD panel, and a diffusion plate is mounted on the upper substrates of the right side LCD panel and the left side LCD panel.

The short ring on the pixel array substrate of the left side LCD panel extends along a left edge and at least one of a top edge and a bottom edge, the short ring on the pixel array substrate of the right side LCD panel extends along a right edge and at least one of a top edge and a bottom edge, each of the pixel arrays in the left side LCD panel and the right side LCD panel includes gate lines extending in parallel to the top or bottom edge, data lines extending in parallel to the left or right edge, and a pixel region formed at each of cross points of the gate lines and the data lines, data line drivers are connected to the data lines on an area of the left side LCD panel adjacent to at least one of the top edge and the bottom edge, and gate line drivers are connected to the gate lines on an area of the left side LCD panel adjacent to the left edge, and data line drivers are connected to the data lines on an area of the right side LCD panel adjacent to at least one of the top edge and the bottom edge, and gate line drivers are connected to the gate lines on an area of the right side LCD panel adjacent to the right edge.

A LCD device in accordance with the present invention comprises:

an upper side LCD panel including a pixel array substrate on which a pixel array, a short ring and an alignment layer are formed, and an opposing transparent substrate on which a common electrode and an alignment layer are formed; and a lower side LCD panel including a pixel array substrate on which a pixel array, a short ring and an alignment layer are formed, and an opposing substrate on which a common electrode and an alignment layer are formed;

wherein one substrate of the pixel array substrate and the opposing substrate of the upper side LCD panel is a lower substrate, and the other substrate is an upper substrate, wherein one substrate of the pixel array substrate and the opposing substrate of the lower side LCD panel is an upper substrate, and the other substrate is a lower substrate, wherein a bottom edge of the upper side LCD panel is bonded to a top edge of the lower side LCD panel, to bond the one substrate of the upper side LCD panel and the other substrate of the lower side LCD panel and to bond the other substrate of the upper side LCD panel and the one substrate of the lower side LCD panel, wherein the alignment layer on the pixel array substrate of the upper side LCD panel is rubbed in a direction from an upper left region to a lower right region of the upper side CD panel, and the alignment layer on the opposing substrate of the upper side LCD panel is rubbed in a direction from a lower left region to an upper right region, and wherein the alignment layer on the pixel array substrate of the lower side LCD panel is rubbed in a direction from a lower left region to an upper right region of the lower side LCD panel, and the alignment layer on the opposing substrate of the lower side LCD panel is rubbed in a direction from an upper left region to a lower right region.

A LCD device in accordance with the present invention comprises:

an upper side LCD panel including a pixel array substrate on which a pixel array, a short ring and an alignment layer are formed, and an opposing transparent substrate on which a common electrode and an alignment layer are formed; and a lower side LCD panel including a pixel array substrate on which a pixel array, a short ring and an alignment layer are formed, and an opposing substrate on which a common electrode and an alignment layer are formed;

wherein one substrate of the pixel array substrate and the opposing substrate of the upper side LCD panel is a lower substrate, and the other substrate is an upper substrate, wherein one substrate of the pixel array substrate and the opposing substrate of the lower side LCD panel is an upper substrate, and the other substrate is a lower substrate, wherein a bottom edge of the upper side LCD panel is bonded to a top edge of the lower side LCD panel, to bond the one substrate of the upper side LCD panel and the other substrate of the lower side LCD panel and to bond the other substrate of the upper side LCD panel and the one substrate of the lower side LCD panel, wherein the alignment layer on the pixel array substrate of the upper side LCD panel is rubbed in a direction from a lower right region to an upper left region of the upper side LCD panel, and the alignment layer on the opposing substrate of the upper side LCD panel is rubbed in a direction from an upper right region to a lower left region, and wherein the alignment layer on the pixel array substrate of the lower side LCD panel is rubbed in a direction from an upper right region to a lower left region of the lower side LCD panel, and the alignment layer on the opposing substrate of the lower side LCD panel is rubbed in a direction from a lower right region to an upper left region.

A liquid crystal material in the upper side LCD panel and the lower side LCD panel is a nematic liquid crystal material with a chiral material causing liquid molecules to twist in a counter clockwise direction.

A color filter is mounted on the opposing substrates of the upper side LCD panel and the lower side LCD panel.

The short ring on the pixel array substrate of the upper side LCD panel extends along a top edge and at least one of a left edge and a right edge, the short ring on the pixel array substrate of the lower side LCD panel extends along a bottom edge and at least one of a left edge and a right edge, each of the pixel arrays in the upper side LCD panel and the lower side LCD panel includes gate lines extending in parallel to the top or bottom edge, data lines extending in parallel to the left or right edge, and a pixel region formed at each of cross points of the gate lines and the data lines, data line drivers are connected to the data lines on an area of the upper side LCD panel adjacent to the top edge, and gate line drivers are connected to the gate lines on an area of the upper side LCD panel adjacent to at least one of the left edge and the right edge, and data line drivers are connected to the data lines on an area of the lower side LCD panel adjacent to the bottom edge, and gate line drivers are connected to the gate lines on an area of the lower side LCD panel adjacent to at least one of the left edge and the right edge.

A LCD device in accordance with the present invention comprises:

an upper left side LCD panel including a pixel array substrate on which a pixel array, a short ring extending along a top edge and a left edge and an alignment layer are formed, and an opposing substrate on which a common electrode and an alignment layer are formed;

an upper right side LCD panel including a pixel array substrate on which a pixel array, a short ring extending along a top edge and a right edge and an alignment layer are formed, and an opposing substrate on which a common electrode and an alignment layer are formed;

a lower right side LCD panel including a pixel array substrate on which a pixel array, a short ring extending along a bottom edge and a right edge and an alignment layer are formed, and an opposing substrate on which a common electrode and an alignment layer are formed; and a lower left side LCD panel including a pixel array substrate on which a pixel array, a short ring extending along a bottom edge and a left edge and an alignment layer are formed, and an opposing substrate on which a common electrode and an alignment layer are formed;

wherein one substrate of the pixel array substrate and the opposing substrate of the upper left side LCD panel is a lower substrate, and the other substrate is an upper substrate, wherein one substrate of the pixel array substrate and the opposing substrate of the upper right side LCD panel is an upper substrate, and the other substrate is a lower substrate, wherein one substrate of the pixel array substrate and the opposing substrate of the lower right side LCD panel is a lower substrate, and the other substrate is an upper substrate, wherein one substrate of the pixel array substrate and the opposing substrate of the lower left side LCD panel is an upper substrate, and the other substrate is a lower substrate, wherein a right edge of the upper left side LCD panel is bonded to a left edge of the upper right side LCD panel, to bond the one substrate of the upper left side LCD panel and the other substrate of the upper right side LCD panel and to bond the other substrate of the upper left side LCD panel and the one substrate of the upper right side LCD panel, wherein a bottom edge of the upper right side LCD panel is bonded to a top edge of the lower right side LCD panel, to bond the one substrate of the upper right side LCD panel and the other substrate of the lower right side LCD panel and to bond the other substrate of the upper right side LCD panel and the one substrate of the lower right side LCD panel, wherein a left edge of the lower right side LCD panel is bonded to a right edge of the lower left side LCD panel, to bond the one substrate of the lower right side LCD panel and the other substrate of the lower left side LCD panel and to bond the other substrate of the lower right side LCD panel and the one substrate of the lower left side LCD panel, wherein a top edge of the lower left side LCD panel is bonded to a bottom edge of the upper left side LCD panel, to bond the one substrate of the lower left side LCD panel and the other substrate of the upper left side LCD panel and to bond the other substrate of the lower left side LCD panel and the one substrate of the upper left side LCD panel, wherein the alignment layer on the pixel array substrate of the upper left side LCD panel is rubbed in a direction from an upper left region to a lower right region of the upper left side LCD panel, and the alignment layer on the opposing substrate of the upper left side LCD panel is rubbed in a direction from a lower left region to an upper right region, wherein the alignment layer on the pixel array substrate of the upper right side LCD panel is rubbed in a direction from an upper right region to a lower left region of the upper right side LCD panel, and the alignment layer on the opposing substrate of the upper right side LCD panel is rubbed in a direction from a lower right region to an upper left region, wherein the alignment layer on the pixel array substrate of the lower right side LCD panel is rubbed in a direction from a lower right region to an upper left region of the lower right side LCD panel, and the alignment layer on the opposing substrate of the lower right side LCD panel is rubbed in a direction from an upper right region to a lower left region, and wherein the alignment layer on the pixel array substrate of the lower left side LCD panel is rubbed in a direction from a lower left region to an upper right region of the lower left side LCD panel, and the alignment layer on the opposing substrate of the lower left side LCD panel is rubbed in a direction from an upper left area to a lower right region.

A LCD device in accordance with the present invention comprises:

an upper left side LCD panel including a pixel array substrate on which a pixel array, a short ring extending along a top edge and a left edge and an alignment layer are formed, and an opposing substrate on which a common electrode and an alignment layer are formed;

an upper right side LCD panel including a pixel array substrate on which a pixel array, a short ring extending along a top edge and a right edge and an alignment layer are formed, and an opposing substrate on which a common electrode and an alignment layer are formed;

a lower right side LCD panel including a pixel array substrate on which a pixel array, a short ring extending along a bottom edge and a right edge and an alignment layer are formed, and an opposing substrate on which a common electrode and an alignment layer are formed; and a lower left side LCD panel including a pixel array substrate on which a pixel array, a short ring extending along a bottom edge and a left edge and an alignment layer are formed, and an opposing substrate on which a common electrode and an alignment layer are formed;

wherein one substrate of the pixel array substrate and the opposing substrate of the upper left side LCD panel is a lower substrate, and the other substrate is an upper substrate, wherein one substrate of the pixel array substrate and the opposing substrate of the upper right side LCD panel is an upper substrate, and the other substrate is a lower substrate, wherein one substrate of the pixel array substrate and the opposing substrate of the lower right side LCD panel is a lower substrate, and the other substrate is an upper substrate, wherein one substrate of the pixel array substrate and the opposing substrate of the lower left side LCD panel is an upper substrate, and the other substrate is a lower substrate, wherein a right edge of the upper left side LCD panel is bonded to a left edge of the upper right side LCD panel, to bond the one substrate of the upper left side LCD panel and the other substrate of the upper right side LCD panel and to bond the other substrate of the upper left side LCD panel and the one substrate of the upper right side LCD panel, wherein a bottom edge of the upper right side LCD panel is bonded to a top edge of the lower right side LCD panel, to bond the one substrate of the upper right side LCD panel and the other substrate of the lower right side LCD panel and to bond the other substrate of the upper right side LCD panel and the one substrate of the lower right side LCD panel, wherein a left edge of the lower right side LCD panel is bonded to a right edge of the lower left side LCD panel, to bond the one substrate of the lower right side LCD panel and the other substrate of the lower left side LCD panel and to bond the other substrate of the lower right side LCD panel and the one substrate of the lower left side LCD panel, wherein a top edge of the lower left side LCD panel is bonded to a bottom edge of the upper left side LCD panel, to bond the one substrate of the lower left side LCD panel and the other substrate of the upper left side LCD panel and to bond the other substrate of the lower left side LCD panel and the one substrate of the upper left side LCD panel, wherein the alignment layer on the pixel array substrate of the upper left side LCD panel is rubbed in a direction from a lower right region to an upper left region of the upper left side LCD panel, and the alignment layer on the opposing substrate of the upper left side LCD panel is rubbed in a direction from an upper right region to a lower left region, wherein the alignment layer on the pixel array substrate of the upper right side LCD panel is rubbed in a direction from a lower left region to an upper right region of the upper right side LCD panel, and the alignment layer on the opposing substrate of the upper right side LCD panel is rubbed in a direction from an upper left region to a lower right region, wherein the alignment layer on the pixel array substrate of the lower right side LCD panel is rubbed in a direction from an upper left region to a lower right region of the lower right side LCD panel, and the alignment layer on the opposing substrate of the lower right side LCD panel is rubbed in a direction from a lower left region to an upper right region, and wherein the alignment layer on the pixel array substrate of the lower left side LCD panel is rubbed in a direction from an upper right region to a lower left region of the lower left side LCD panel, and the alignment layer on the opposing substrate of the lower left side LCD panel is rubbed in a direction from a lower right region to an upper left region.

A liquid crystal material in the upper left side LCD panel, the upper right side LCD panel, the lower right side LCD panel and the lower left side LCD panel is a nematic liquid crystal material with a chiral material causing liquid molecules to twist in a counter clockwise direction.

A color filter is formed on the opposing substrates of the upper left side LCD panel, the upper right side LCD panel, the lower right side LCD panel and the lower left side LCD panel.

A light source is mounted to direct the light to the lower substrates of the upper left side LCD panel, the upper right side LCD panel, the lower right side LCD panel and the lower left side LCD panel, and a diffusion plate is mounted on the upper substrates of the upper left side LCD panel, the upper right side LCD panel, the lower right side LCD panel and the lower left side LCD panel.

Each of the pixel arrays in the upper left side LCD panel, the upper right side LCD panel, the lower right side LCD panel and the lower left side LCD panel includes gate lines extending in parallel to the top or bottom edge, data lines extending in parallel to the left or right edge, and a pixel region formed at each of cross points of the gate lines and the data lines, data line drivers are connected to the data lines on an area of the upper left side LCD panel adjacent to the top edge, and gate line drivers are connected to the gate lines on an area of the upper left side LCD panel adjacent to the left edge, data line drivers are connected to the data lines on an area of the upper right side LCD panel adjacent to the top edge, and gate line drivers are connected to the gate lines on an area of the upper right side LCD panel adjacent to the right edge, data line drivers are connected to the data lines on an area of the lower right side LCD panel adjacent to the bottom edge, and gate line drivers are connected to the gate lines on an area of the lower right side LCD panel adjacent to the right edge, and data line drivers are connected to the data lines on an area of the lower left side LCD panel adjacent to the bottom edge, and gate line drivers are connected to the gate lines on an area of the lower left side LCD panel adjacent to the left edge.

A LCD device in accordance with the present invention comprises:
  a left side LCD panel including a pixel array substrate on which a pixel array, a short ring and an alignment layer are formed, and an opposing transparent substrate on which a common electrode and an alignment layer are formed; and
  a right side LCD panel including a pixel array substrate on which a pixel array, a short ring and an alignment layer are formed, and an opposing transparent substrate on which a common electrode and an alignment layer are formed;
  wherein one substrate of the pixel array substrate and the opposing substrate of the left side LCD panel is a lower substrate, and the other substrate is an upper substrate,
  wherein one substrate of the pixel array substrate and the opposing substrate of the right side LCD panel is an upper substrate, and the other substrate is a lower substrate,
  wherein a right edge of the left side LCD panel is bonded to a left edge of the right side LCD panel, to bond the one substrate of the left side LCD panel and the other substrate of the right side LCD panel and to bond the other substrate of the left side LCD panel and the one substrate of the right side LCD panel,
  wherein the alignment layer on the pixel array substrate of the left side LCD panel is rubbed in a direction from an upper left region to a lower right region of the left side LCD panel, and the alignment layer on the opposing substrate of the left side LCD panel is rubbed in a direction from a lower left region to an upper right region, and
  wherein the alignment layer on the pixel array substrate of the right side LCD panel is rubbed in a direction from a lower right region to an upper left region of the right side LCD panel, and the alignment layer on the opposing substrate of the right side LCD panel is rubbed in a direction from an upper right region to a lower left region.

A LCD device in accordance with the present invention comprises:
  a left side LCD panel including a pixel array substrate on which a pixel array, a short ring and an alignment layer are formed, and an opposing transparent substrate on which a common electrode and an alignment layer are formed; and
  a right side LCD panel including a pixel array substrate on which a pixel array, a short ring and an alignment layer are formed, and an opposing transparent substrate on which a common electrode and an alignment layer are formed;
  wherein one substrate of the pixel array substrate and the opposing substrate of the left side LCD panel is a lower substrate, and the other substrate is an upper substrate,
  wherein one substrate of the pixel array substrate and the opposing substrate of the right side LCD panel is an upper substrate, and the other substrate is a lower substrate,
  wherein a right edge of the left side LCD panel is bonded to a left edge of the right side LCD panel, to bond the one substrate of the left side LCD panel and the other substrate of the right side LCD panel and to bond the other substrate of the left side LCD panel and the one substrate of the right side LCD panel,
  wherein the alignment layer on the pixel array substrate of the left side LCD panel is rubbed in a direction from a lower right region to an upper left region of the left side LCD panel, and the alignment layer on the opposing substrate of the left side LCD panel is rubbed in a direction from an upper right region to a lower left region, and
  wherein the alignment layer on the pixel array substrate of the right side LCD panel is rubbed in a direction from an upper left region to a lower right region of the right side LCD panel, and the alignment layer on the opposing substrate of the right side LCD panel is rubbed in a direction from a lower left region to an upper right region.

A liquid crystal material in the left side LCD panel is a nematic liquid crystal material with a chiral material causing liquid molecules to twist in a counter clockwise direction, and a liquid crystal material in the right side LCD panel is a nematic liquid crystal material with a chiral material causing liquid molecules to twist in a clockwise direction.

A color filter is formed on the opposing substrates of the left side LCD panel and the right side LCD panel.

The short ring on the pixel array substrate of the left side LCD panel extends along a left edge and at least one of a top edge and a bottom edge,
  the short ring on the pixel array substrate of the right side LCD panel extends along a right edge and at least one of a top edge and a bottom edge,
  each of the pixel arrays in the left side LCD panel and the right side LCD panel includes gate lines extending in parallel to the top or bottom edge, data lines extending in parallel to the left or right edge, and a pixel region formed at each of cross points of the gate lines and the data lines,
  data line drivers are connected to the data lines on an area of the left side LCD panel adjacent to at least one of the top edge and the bottom edge, and gate line drivers are connected to the gate lines on an area of the left side LCD panel adjacent to the left edge, and
  data line drivers are connected to the data lines on an area of the right side LCD panel adjacent to at least one of the top edge and the bottom edge, and gate line drivers are connected to the gate lines on an area of the right side LCD panel adjacent to the right edge.

A LCD device in accordance with the present invention comprises:
  an upper left side LCD panel including a pixel array substrate on which a pixel array, a short ring extending along a top edge and a left edge and an alignment layer are formed, and an opposing substrate on which a common electrode and an alignment layer are formed;
  an upper right side LCD panel including a pixel array substrate on which a pixel array, a short ring extending along a top edge and a right edge and an alignment layer are formed, and an opposing substrate on which a common electrode and an alignment layer are formed;
  a lower right side LCD panel including a pixel array substrate on which a pixel array, a short ring extending along a bottom edge and a right edge and an alignment layer are formed, and an opposing substrate on which a common electrode and an alignment layer are formed; and a lower left side LCD panel including a pixel array substrate on which a pixel array, a short ring extending along a bottom edge and a left edge and an alignment layer are formed, and an opposing substrate on which a common electrode and an alignment layer are formed;

wherein one substrate of the pixel array substrate and the opposing substrate of the upper left side LCD panel is a lower substrate, and the other substrate is an upper substrate, wherein one substrate of the pixel array substrate and the opposing substrate of the upper right side LCD panel is an upper substrate, and the other substrate is a lower substrate, wherein one substrate of the pixel array substrate and the opposing substrate of the lower right side LCD panel is a lower substrate, and the other substrate is an upper substrate, wherein one substrate of the pixel array substrate and the opposing substrate of the lower left side LCD panel is an upper substrate, and the other substrate is a lower substrate, wherein a right edge of the upper left side LCD panel is bonded to a left edge of the upper right side LCD panel, to bond the one substrate of the upper left side LCD panel and the other substrate of the upper right side LCD panel and to bond the other substrate of the upper left side LCD panel and the one substrate of the upper right side LCD panel, wherein a bottom edge of the upper right side LCD panel is bonded to a top edge of the lower right side LCD panel, to bond the one substrate of the upper right side LCD panel and the other substrate of the lower right side LCD panel and to bond the other substrate of the upper right side LCD panel and the one substrate of the lower right side LCD panel, wherein a left edge of the lower right side LCD panel is bonded to a right edge of the lower left side LCD panel, to bond the one substrate of the lower right side LCD panel and the other substrate of the lower left side LCD panel and to bond the other substrate of the lower right side LCD panel and the one substrate of the lower left side LCD panel, wherein a top edge of the lower left side LCD panel is bonded to a bottom edge of the upper left side LCD panel, to bond the one substrate of the lower left side LCD panel and the other substrate of the upper left side LCD panel and to bond the other substrate of the lower left side LCD panel and the one substrate of the upper left side LCD panel, wherein the alignment layer on the pixel array substrate of the upper left side LCD panel is rubbed in a direction from an upper left region to a lower right region of the upper left side LCD panel, and the alignment layer on the opposing substrate of the upper left side LCD panel is rubbed in a direction from a lower left region to an upper right region, wherein the alignment layer on the pixel array substrate of the upper right side LCD panel is rubbed in a direction from a lower right region to an upper left region of the upper right side LCD panel, and the alignment layer on the opposing substrate of the upper right side LCD panel is rubbed in a direction from an upper right region to a lower left region, wherein the alignment layer on the pixel array substrate of the lower right side LCD panel is rubbed in a direction from an upper right region to a lower left region of the lower right side LCD panel, and the alignment layer on the opposing substrate of the lower right side LCD panel is rubbed in a direction from a lower right region to an upper left region, and wherein the alignment layer on the pixel array substrate of the lower left side LCD panel is rubbed in a direction from a lower left region to an upper right region of the lower left side LCD panel, and the alignment layer on the opposing substrate of the lower left side LCD panel is rubbed in a direction from an upper left region to a lower right region.

A LCD device in accordance with the present invention comprises:

an upper left side LCD panel including a pixel array substrate on which a pixel array, a short ring extending along a top edge and a left edge and an alignment layer are formed, and an opposing substrate on which a common electrode and an alignment layer are formed;

an upper right side LCD panel including a pixel array substrate on which a pixel array, a short ring extending along a top edge and a right edge and an alignment layer are formed, and an opposing substrate on which a common electrode and an alignment layer are formed;

a lower right side LCD panel including a pixel array substrate on which a pixel array, a short ring extending along a bottom edge and a right edge and an alignment layer are formed, and an opposing substrate on which a common electrode and an alignment layer are formed; and a lower left side LCD panel including a pixel array substrate on which a pixel array, a short ring extending along a bottom edge and a left edge and an alignment layer are formed, and an opposing substrate on which a common electrode and an alignment layer are formed;

wherein one substrate of the pixel array substrate and the opposing substrate of the upper left side LCD panel is a lower substrate, and the other substrate is an upper substrate, wherein one substrate of the pixel array substrate and the opposing substrate of the upper right side LCD panel is an upper substrate, and the other substrate is a lower substrate, wherein one substrate of the pixel array substrate and the opposing substrate of the lower right side LCD panel is a lower substrate, and the other substrate is an upper substrate, wherein one substrate of the pixel array substrate and the opposing substrate of the lower left side LCD panel is an upper substrate, and the other substrate is a lower substrate, wherein a right edge of the upper left side LCD panel is bonded to a left edge of the upper right side LCD panel, to bond the one substrate of the upper left side LCD panel and the other substrate of the upper right side LCD panel and to bond the other substrate of the upper left side LCD panel and the one substrate of the upper right side LCD panel, wherein a bottom edge of the upper right side LCD panel is bonded to a top edge of the lower right side LCD panel, to bond the one substrate of the upper right side LCD panel and the other substrate of the lower right side LCD panel and to bond the other substrate of the upper right side LCD panel and the one substrate of the lower right side LCD panel, wherein a left edge of the lower right side LCD panel is bonded to a right edge of the lower left side LCD panel, to bond the one substrate of the lower right side LCD panel and the other substrate of the lower left side LCD panel and to bond the other substrate of the lower right side LCD panel and the one substrate of the lower left side LCD panel, wherein a top edge of the lower left side LCD panel is bonded to a bottom edge of the upper left side LCD panel, to bond the one substrate of the lower left side LCD panel and the other substrate of the upper left side LCD panel and to bond the other substrate of the lower left side LCD panel and the one substrate of the upper left side LCD panel, wherein the alignment layer on the pixel array substrate of the upper left side LCD panel is rubbed in a direction from a lower right region to an upper left region of the upper left side LCD panel, and the alignment layer on the opposing substrate of the upper left side LCD panel is rubbed in a direction from an upper right region to a lower left region, wherein the alignment layer on the pixel array substrate of the upper right side LCD panel is rubbed in a direction from an upper left region to a lower right region of the upper right side LCD panel, and the alignment layer on the opposing substrate of the upper right side LCD panel is rubbed in a direction from a lower left region to an upper right region, wherein the alignment layer on the pixel array substrate of the lower right side LCD panel is rubbed in a direction from a lower left region to an upper right region of the lower right side LCD panel, and the alignment layer on the opposing substrate of the lower right side LCD panel is rubbed in a direction from an upper left region to a lower right region, and wherein the alignment layer on the pixel array substrate of the lower left side LCD panel is rubbed in a direction from an upper right region to a lower left region of the lower left side LCD panel, and the alignment layer on the opposing substrate of the lower left side LCD panel is rubbed in a direction from a lower right region to an upper left region.

A liquid crystal material in the upper left side LCD panel and the lower left side LCD panel is a nematic liquid crystal material with a chiral material causing liquid molecules to twist in a counter clockwise direction, and a liquid crystal material in the upper right side LCD panel and the lower right side LCD panel is a nematic liquid crystal material with a chiral material causing liquid molecules to twist in a clockwise direction.

A color filter is formed on the opposing substrates of the upper left side LCD panel, the upper right side LCD panel, the lower right side LCD panel and the lower left side LCD panel.

Each of the pixel arrays in the upper left side LCD panel, the upper right side LCD panel, the lower right side LCD panel and the lower left side LCD panel includes gate lines extending in parallel to the top or bottom edge, data lines extending in parallel to the left or right edge, and a pixel region formed at each of cross points of the gate lines and the data lines, data line drivers are connected to the data lines on an area of the upper left side LCD panel adjacent to the top edge, and gate line drivers are connected to the gate lines on an area of the upper left side LCD panel adjacent to the left edge, data line drivers are connected to the data lines on an area of the upper right side LCD panel adjacent to the top edge, and gate line drivers are connected to the gate lines on an area of the upper right side LCD panel adjacent to the right edge, data line drivers are connected to the data lines on an area of the lower right side LCD panel adjacent to the bottom edge, and gate line drivers are connected to the gate lines on an area of the lower right side LCD panel adjacent to the right edge, and data line drivers are connected to the data lines on an area of the lower left side LCD panel adjacent to the bottom edge, and gate line drivers are connected to the gate lines on an area of the lower left side LCD panel adjacent to the left edge.

BRIEF DESCRIPTION OF THE DRAWINGS

Preferred embodiments of the present invention will now be described, by way of example only, with reference to the accompanying drawings in which.

Figure 8:
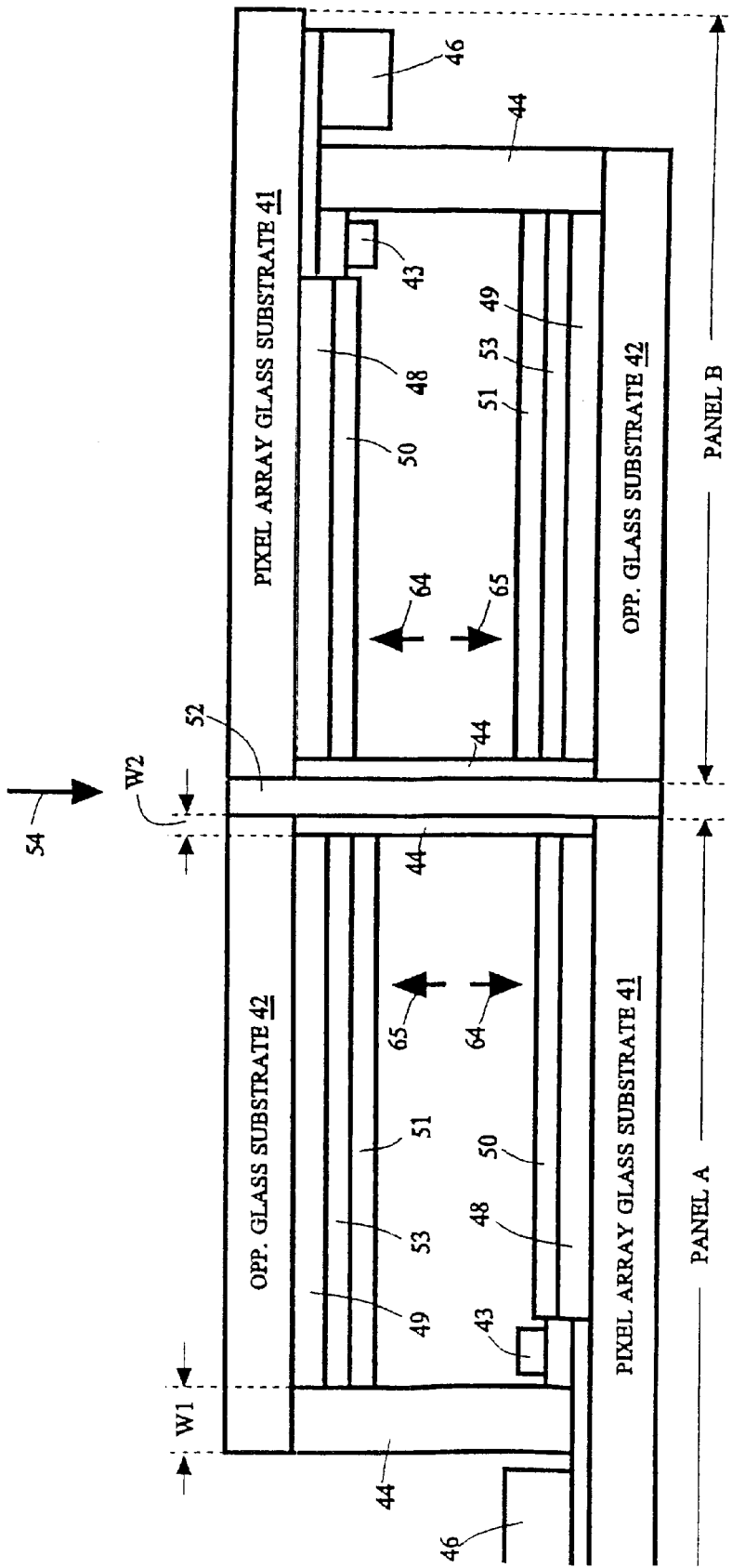
FIG. 8 shows the cross section of the tiling panel 40 along the lines 47—47 shown in the FIG. 7.
Figure 14:
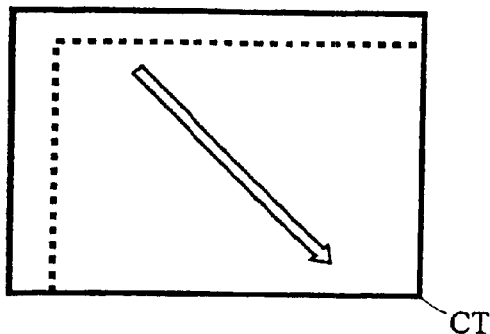
Figure 14:
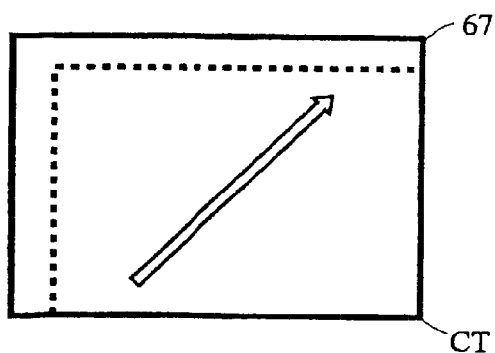
Figure 14:
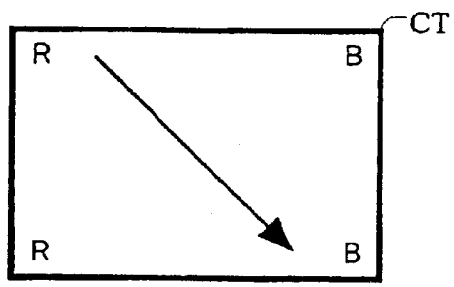
Figure 14:
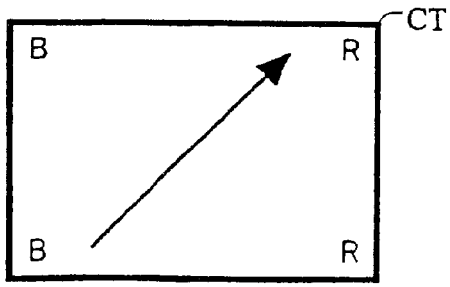

The FIG. 14 shows the rubbing direction of the alignment layers 50 (FIG. 8) on the inside surface of the pixel array glass substrate 41 when the alignment layer 50 is viewed in a direction of an arrow 64 shown in the FIG. 8, and the rubbing direction of the alignment layer 51 (FIG. 8) on the inside surface of the opposing glass substrate 42 when the alignment layer 51 is viewed in a direction of an arrow 65 shown in the FIG. 8.

Figure 15:
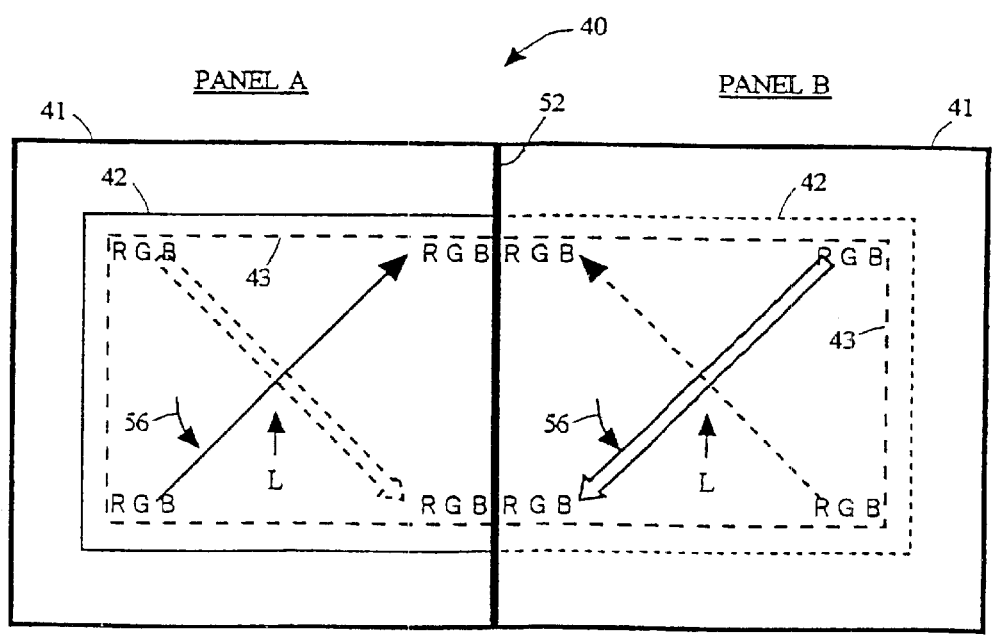

The FIG. 15 shows the third embodiment of the color LCD device constituted by the tiling panel 40 in accordance with the present invention.

Figure 16:
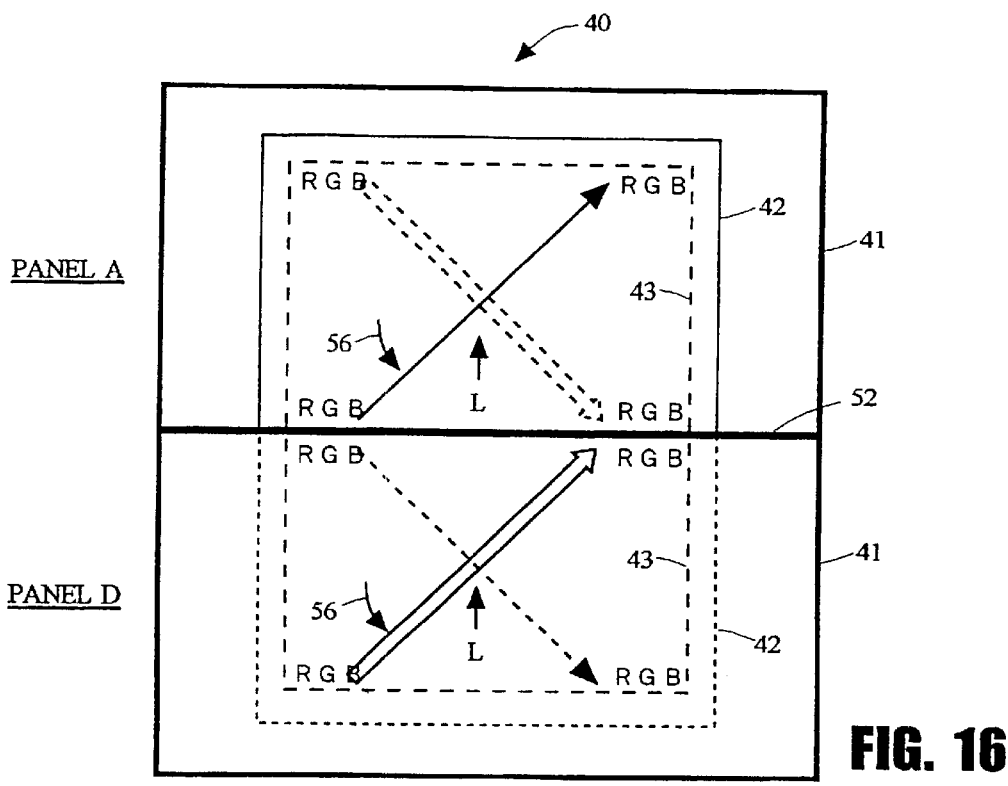

The FIG. 16 shows the fourth embodiment of the color LCD device constituted by the tiling panel 40 in accordance with the present invention.

Figure 17:
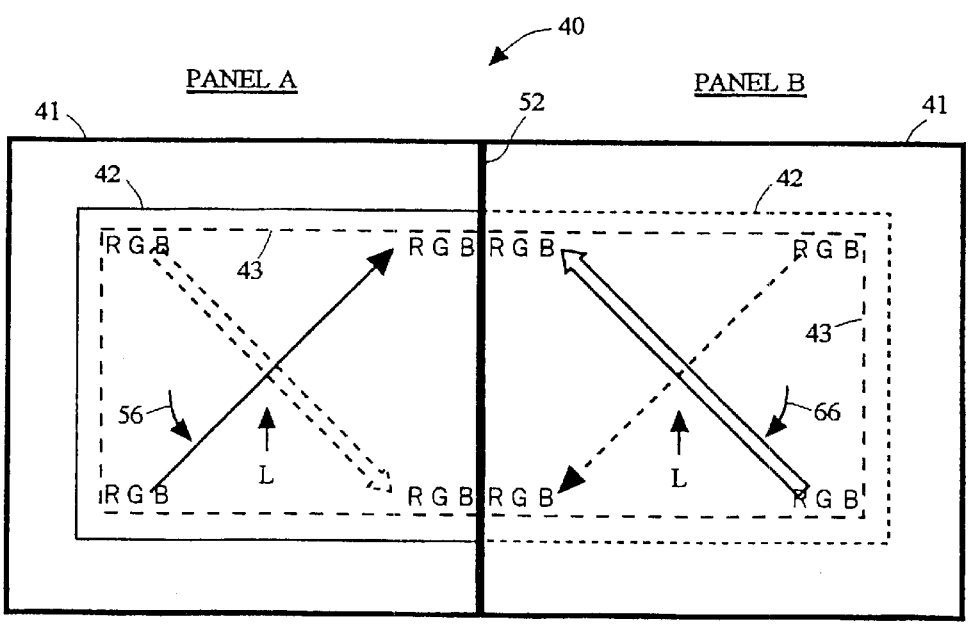

The FIG. 17 shows the fifth embodiment of the color LCD device constituted by the tiling panel 40 in accordance with the present invention.

DETAILED DESCRIPTION OF THE PREFERRED EMBODIMENTS OF THE INVENTION

The First Embodiment of the Present Invention

Figure 1:
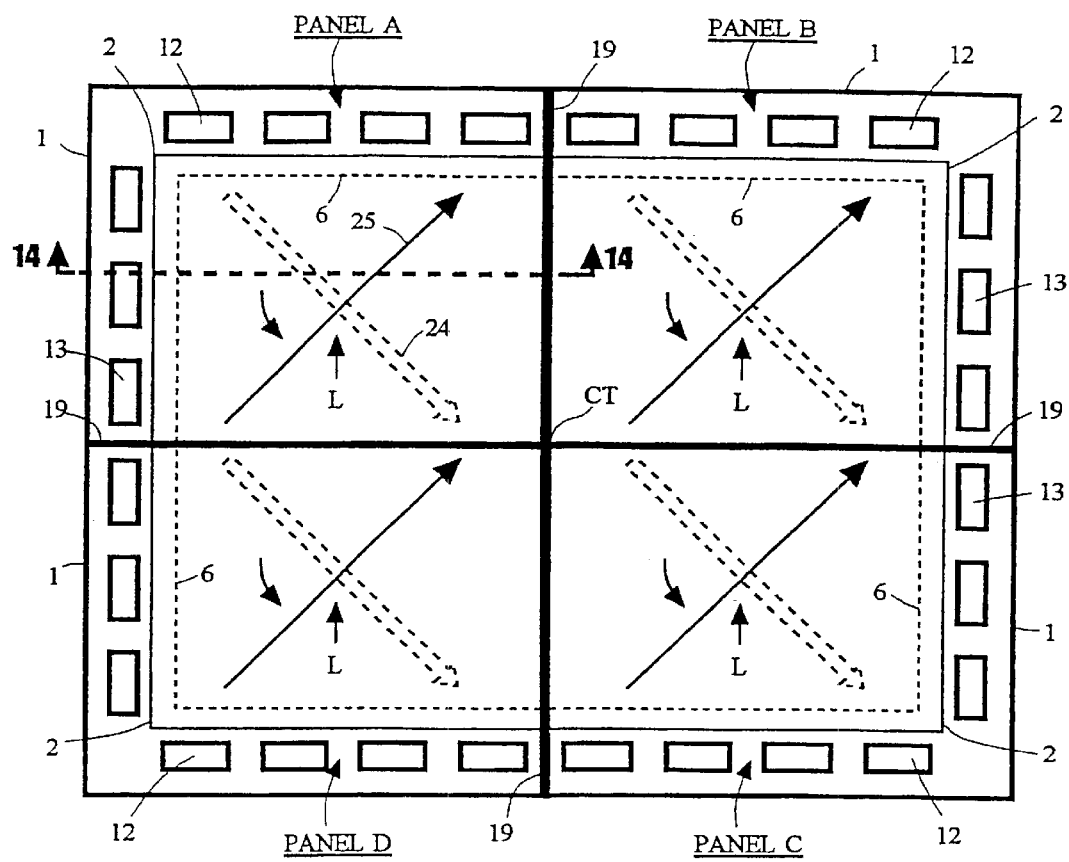
FIG. 1 shows the tiling panel.
Figure 7:
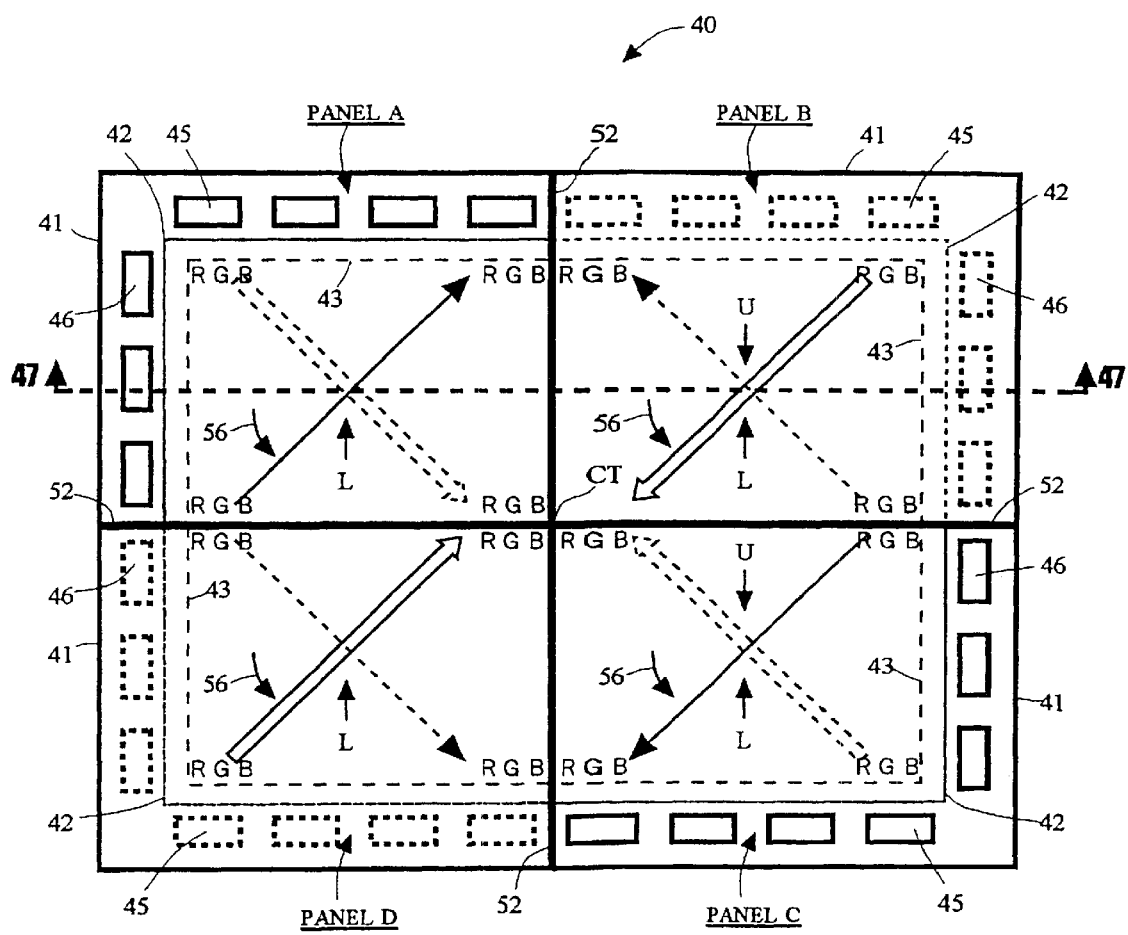
FIG. 7 shows a first embodiment of the color LCD device constituted by the tiling panel in accordance with the present invention.

FIG. 7 shows the first embodiment of the color LCD device constituted by the tiling panel 40 in accordance with the present invention. The tiling panel 40 includes a plurality of discrete LCD panels. In the first embodiment, four LCD panels, i.e. an upper left side LCD panel A, an upper right side LCD panel B, a lower right side LCD panel C and a lower left side LCD panel D are used. The four LCD panels are bonded together along bonding region 52, as in the case of the prior tiling panel shown in FIG. 1. A cross point of the vertical bonding region 52 and the horizontal bonding region 52 is the center point (CT) of the tiling panel 40.

Figure 5:
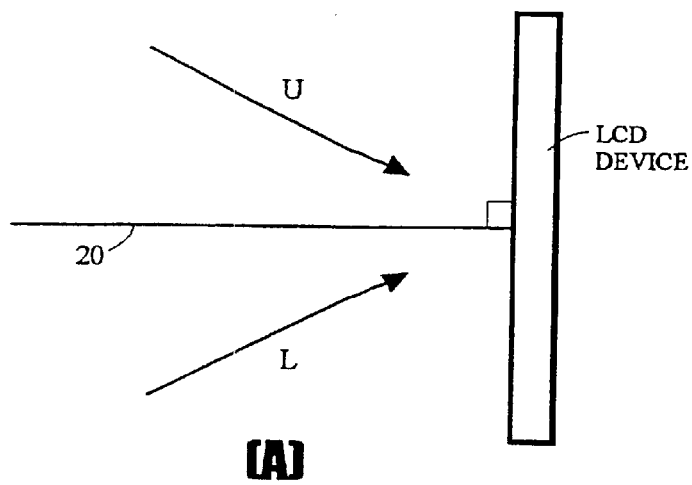
FIG. 5 shows the rubbing direction of the upper and lower alignment layers and the viewing angles.
Figure 5:
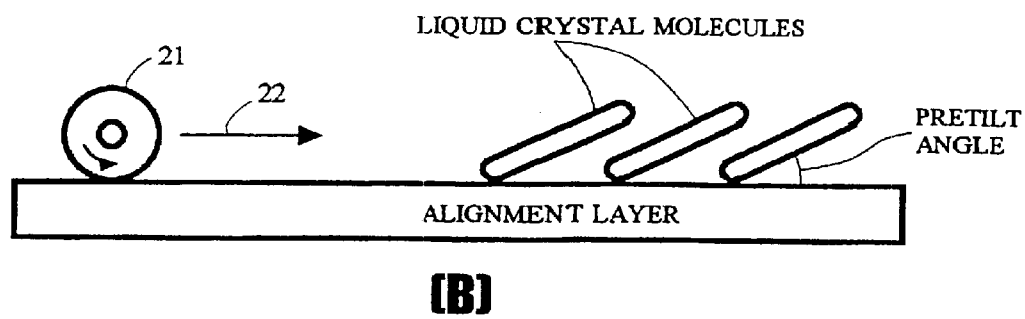
Figure 5:
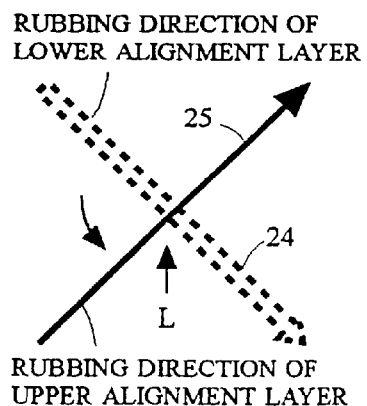
Figure 5:
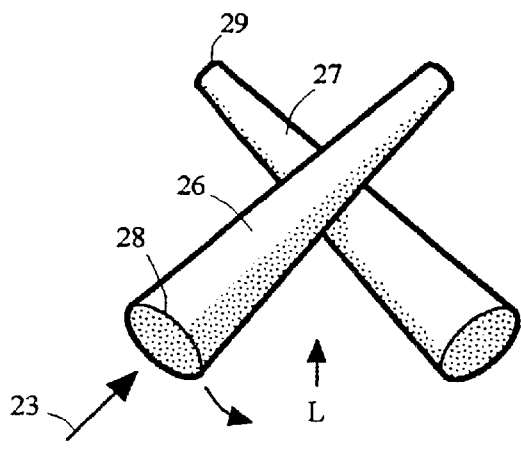

FIG. 8 shows the cross section of the tiling panel 40 along the lines 47—47 shown in the FIG. 7. The user sees the LCD device in a direction of an arrow 54 which corresponds to the lower side direction L, shown in the FIG. 5(A). Each of the LCD panels A, B, C and D includes a transparent substrate or the glass substrate 41 and a transparent substrate or the glass substrate 42. Each of the four LCD panels is fabricated by the process described with reference to the FIG. 3, and the structure formed on the glass substrates 41 and 42 is substantially the same as that described with reference to the FIGS. 2 and 3. That is, on the surface of the glass substrate 41, (a) a pixel array 48, which includes a plurality of data lines DL1 through DLN, as shown in the FIG. 3, extending along the vertical direction, a plurality of gate lines GL1 through GLM, as shown in the FIG. 3 extending along the horizontal direction, and a plurality of pixel regions, each of which is formed at each of the cross points of the data lines and the gate lines, (b) the inner short ring 43 made of an electrically conductive material for preventing the TFTs of the pixel regions from being damaged by the ESD, (c) an alignment layer 50 called as a rubbing layer, and (d) the circuit modules 45 and 46 connected the data lines and gate lines, respectively are formed. Therefore, the glass substrate 41 is called as a pixel array glass substrate hereinafter. As described before with reference to the FIG. 3, one pixel region includes the thin film transistor (TFT) 3 having a source electrode connected to the pixel electrode P, a drain electrode connected to the data line and a gate electrode connected to the gate line, and the pixel electrode P.

On the surface of the glass substrate 42, the color filters 49, i.e. Red color filters, Green color filters and Blue color filters, the common electrode 53, and the alignment layer 51 are formed. The glass substrate 42 is called as an opposing glass substrate hereinafter. The structure of each LCD panel is described later.

Figure 2:
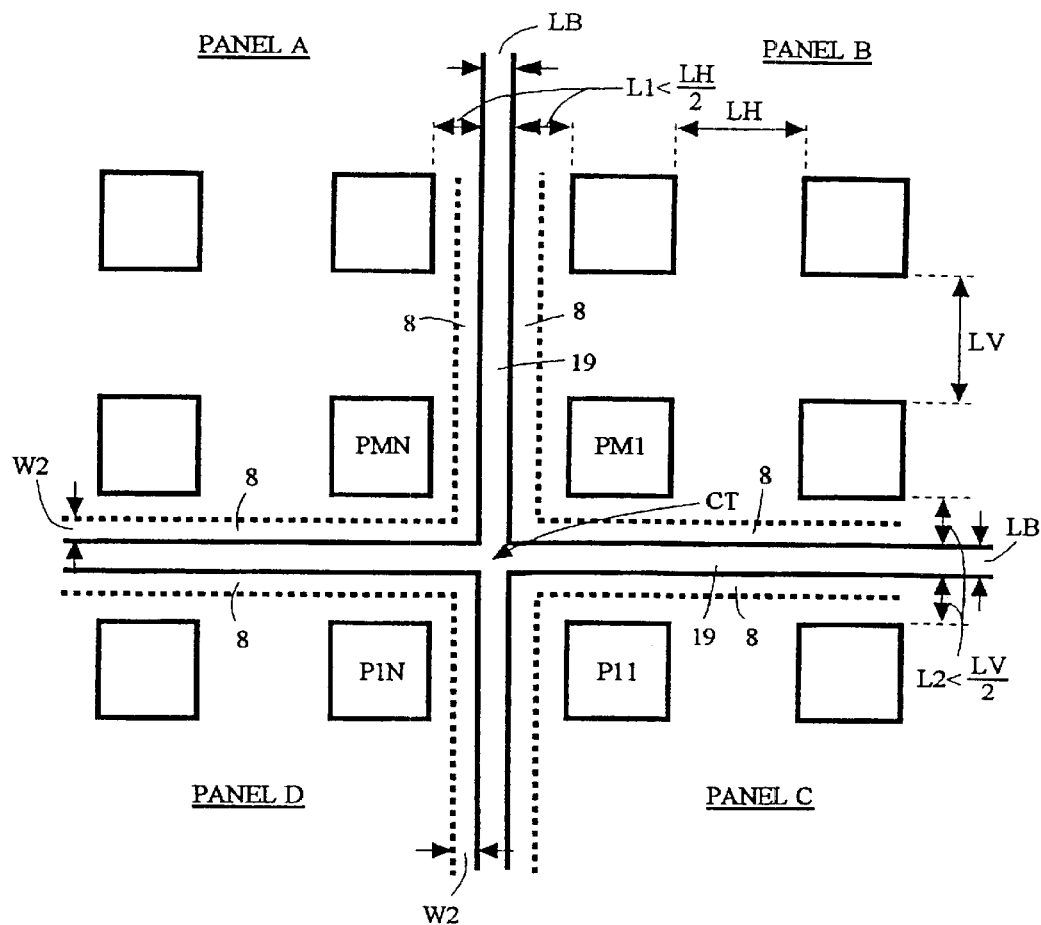
FIG. 2 shows an arrangement of pixel regions of the LCD panels A, B, C and D.
Figure 3:
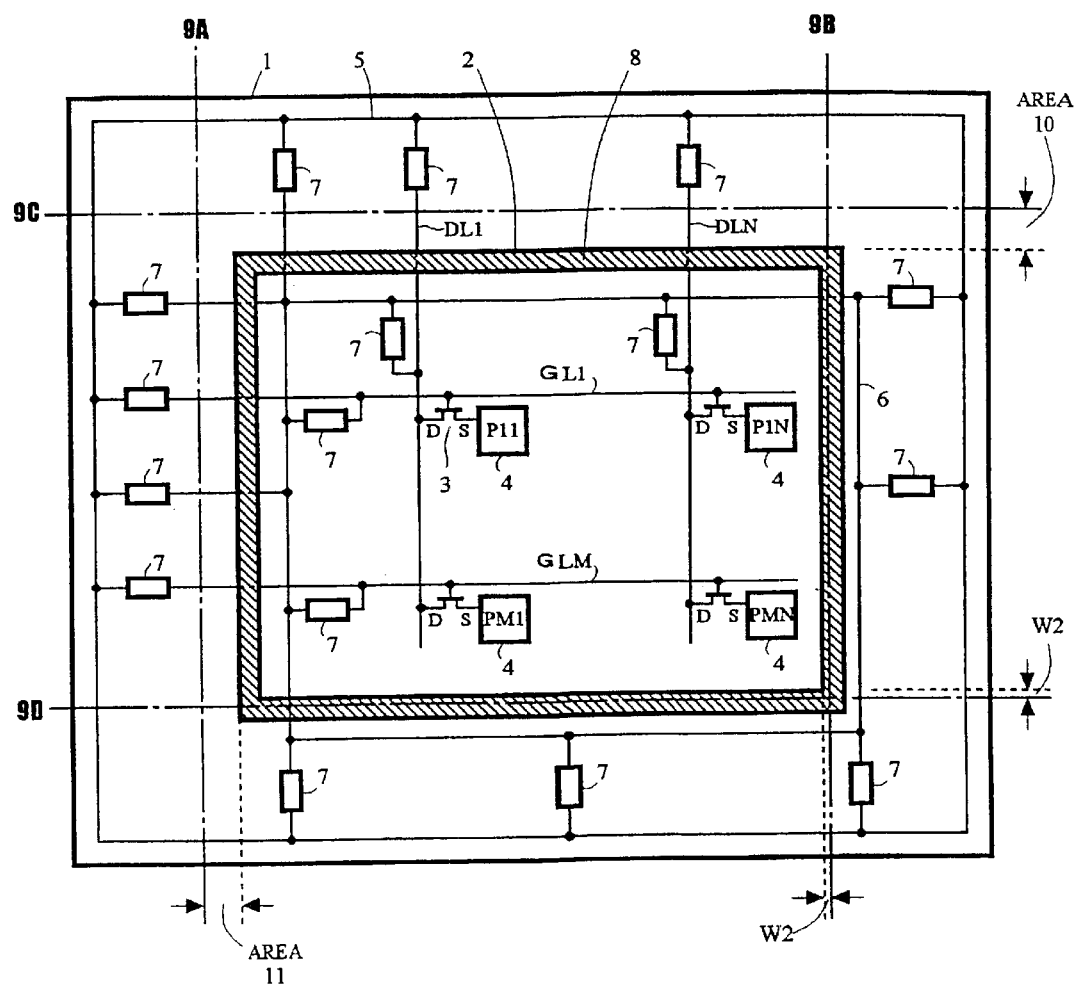
FIG. 3 shows the structure on the TFT substrate 1 and the CF substrate 2.
Figure 4:
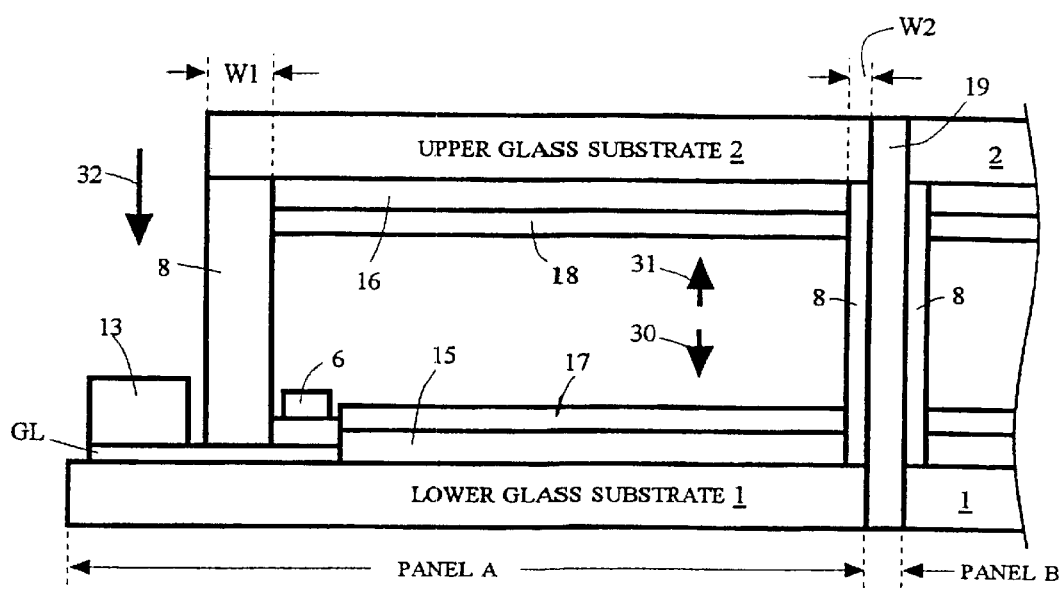
FIG. 4 shows a cross section of the LCD panel A and a portion of the LCD panel B along a line 14—14 in the FIG. 1.

Each of the LCD panels is cut in the manner described with reference to the FIG. 3 to satisfy the positional relationship shown in the FIG. 2, to display the natural and continuous image over the bonding regions 52. More particularly, as shown in the FIG. 2, the distance between the pixel region PMN at the most lower right position of the panel A and the pixel region PM1 at the most lower left position of the panel B, and the distance between the pixel region P1N at the most upper right position of the panel D and the pixel region P11 at the most upper left position of the panel C should be the distance represented by 2L1+LB, wherein the L1<LH/2, and LB is the width of the bonding region 52. Further, the distance between the pixel region PMN of the panel A and the pixel region P1N of the panel D, and the distance between the pixel region PM1 of the panel B and the pixel region P11 of the panel C should be the distance represented by 2L2+LB, wherein the L2<LV/2.

The pixel array glass substrate 41 and the opposing glass substrate 42 are sealed along the sealing region 44 to complete the LCD panel. To satisfy the positional relationship of the pixel regions on the adjacent LCD panels, as shown in the FIG. 2, the original width W1 (about 500 through 1000 m) of the sealing region 44 is reduced to the narrow width W2 (about 50 through 100 m) at the bonding region 52.

Next, the structure of the short ring 43, the positional relationship of the substrate 41 and 42, the rubbing direction of the alignment layers 50 and 51 and the color filter 49 of each LCD panel shown in the FIGS. 7 and 8, is described in detail.

In the upper left side LCD panel A, the short ring 43 extends along a top edge and a left edge. In the upper right side LCD panel B, the short ring 43 extends along a top edge and a right edge. In the lower right side LCD panel C, the short ring 43 extends along a bottom edge and a right edge. In the lower left side LCD panel D, the short ring 43 extends along a bottom edge and a left edge.

In the LCD panel A, the pixel array glass substrate 41 is a lower substrate, and the opposing glass substrate 42 is an upper substrate. In the LCD panel B, the pixel array glass substrate 41 is an upper substrate, and the opposing glass substrate 42 is a lower substrate. In the LCD panel C, the pixel array glass substrate 41 is a lower substrate, and the opposing glass substrate 42 is an upper substrate. In the LCD panel D, the pixel array glass substrate 41 is a upper substrate, and the opposing glass substrate is a lower substrate, The right edge of the upper left side LCD panel A is bonded to the left edge of the upper right side LCD panel B, to bond the substrate 42 the LCD panel A and the substrate 41 of the LCD panel B and to bond the substrate 41 of the LCD panel A and the substrate 42 of the LCD panel B. The bottom edge of the upper right side LCD panel B is bonded to the top edge of the lower right side LCD panel C, to bond the substrate 42 the LCD panel B and the substrate 41 of the LCD panel C and to bond the substrate 41 of the LCD panel B and the substrate 42 of the LCD panel C. The left edge of the lower right side LCD panel C is bonded to the right edge of the lower left side LCD panel D, to bond the substrate 42 the LCD panel C and the substrate 41 of the LCD panel D and to bond the substrate 41 of the LCD panel C and the substrate 42 of the LCD panel D. The top edge of the lower left side LCD panel D is bonded to the bottom edge of the upper left side LCD panel A, to bond the substrate 42 the LCD panel D and the substrate 41 of the LCD panel A and to bond the substrate 41 of the LCD panel D and the substrate 42 of the LCD panel A.

Next, the rubbing direction of the alignment layers 50 and 51 (FIG. 8) is described. The rubbing process is performed by the rotating roller 21, as shown in the FIG. 5(B). It is noted that the rubbing direction of the alignment layers 50 and 51 shown in the FIG. 7 is the direction which is observed in the direction of the arrow 54 in the FIG. 8. The arrow with double line indicates the rubbing direction of the alignment layer 50 (FIG. 8) on the pixel array glass substrate 41, and the arrow with a single line indicates the rubbing direction of the alignment layer 51 (FIG. 8) on the opposing glass substrate 42. Further, the arrow shown by the dotted line indicates the rubbing direction of alignment layer of the lower glass substrate, and the arrow shown by the solid line indicates the rubbing direction of the alignment layer of the upper glass substrate.

In the upper left side LCD panel A, the alignment layer 50 on the pixel array transparent substrate 41 is rubbed in a direction from the upper left region to the lower right region, and the alignment layer 51 on the opposing transparent substrate 42 is rubbed in a direction from the lower left region to the upper right region.

In the upper right side LCD panel B, the alignment layer 50 on the pixel array transparent substrate 41 is rubbed in the direction from the upper right region to the lower left region, and the alignment layer 51 on the opposing transparent substrate 42 is rubbed in a direction from the lower right region to the upper left region.

In the lower right side LCD panel C, the alignment layer 50 on the pixel array transparent substrate 41 is rubbed in a direction from the lower right region to the upper left region, and the alignment layer 51 on the opposing transparent substrate 42 is rubbed in a direction from the upper right region to the lower left region.

In the lower left side LCD panel D, the alignment layer 50 on the pixel array transparent substrate 41 is rubbed in a direction from the lower left region to the upper right region, and the alignment layer 51 on the opposing transparent substrate 42 is rubbed in a direction from the upper left region to the lower right region.

The liquid crystal material in the four LCD panels A, B, C and D is the 90 degree twisted, nematic liquid crystal material with a chiral material, or chiral dopant, which causes the liquid molecules to rotate in a counter clockwise direction (leftward rotation). The 90 degree twisted nematic liquid crystal material and the chiral material well known in the art can be used in the present invention. One example of the chiral material causing the liquid crystal molecules to rotate in the counter clockwise direction is C-15 of BDH Corp, and one example of the chiral material causing the liquid crystal molecules to rotate in the clockwise direction is CB-15 of the BDH Corp.. These chiral material can be used in the present invention. Since such liquid crystal material and the chiral material are well known in the art, these are not described in detail.

Describing the color filter, the color filters are arranged in a vertical stripe scheme, that is, a plurality of the Red filters are vertically aligned, a plurality of the Green filters are vertically aligned, and a plurality of the Red filters are vertically aligned, as shown in the FIG. 7. In the horizontal direction, the color filters are arranged in the sequence of R, G, B, R, G, B, . . . R, G, B, as shown in the FIG. 7.

Describing the circuit modules 45 and 46, the circuit modules 45, such as the data line drivers, are connected to the data lines through a bonding film, such as an anisotropic conductive film (ACF), and the circuit modules 46, such as the gate line drivers, are connected to the gate lines through the ACF. In place of this structure, a flexible circuit board or TAB (Tape Automated Bonding) tape, on which the circuit modules 45 are mounted, can be connected to the data lines by the ACF, and a flexible circuit board or TAB tape, on which the circuit modules 46 are mounted, can be connected to the gate lines by the ACF. In the LCD panels A and C, the circuit modules 45 and 46 or the flexible circuit boards are mounted on the upper surface of the pixel array glass substrate 41. In the LCD panels B and D, the circuit modules 45 and 46 or the flexible circuit boards are mounted on the back side or lower surface of the pixel array glass substrate 41.

Figure 9:
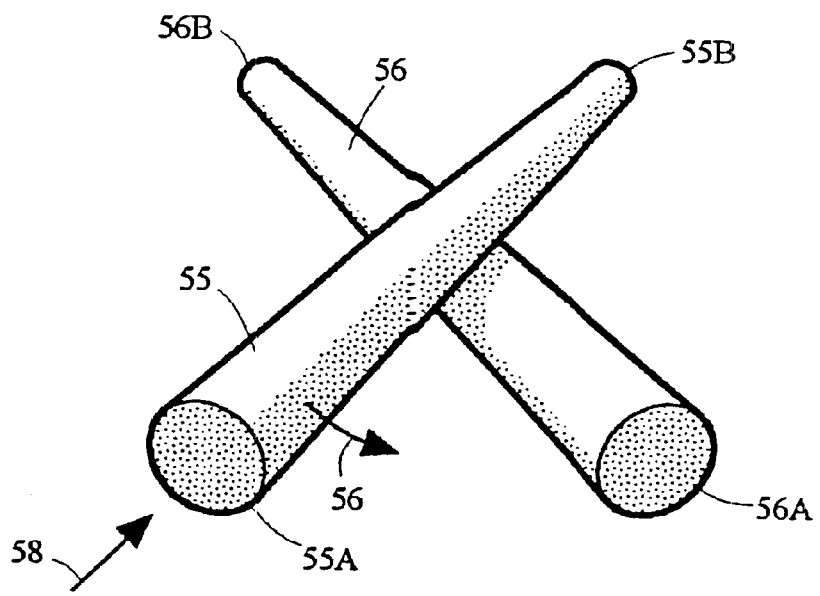
FIG. 9 shows the arrangement of the liquid crystal molecules.
Figure 9:
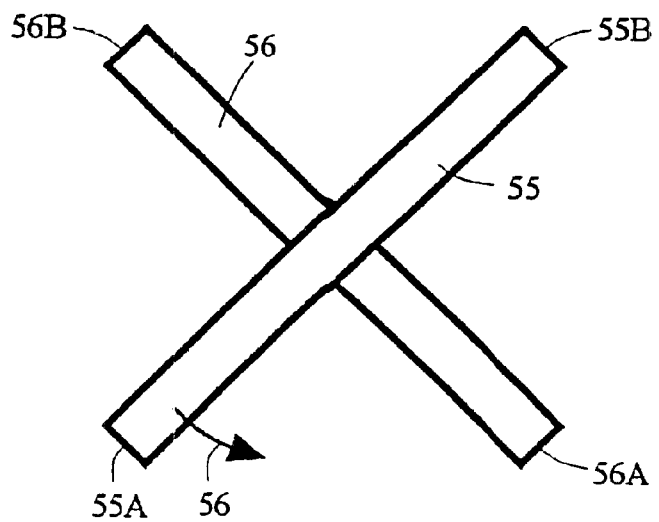

Next, the viewing direction giving the wide viewing angle providing the good contrast ratio with respect to the LCD device shown in the FIG. 7 is described. As described with reference to the FIG. 5(A), the user usually sees the LCD device 40 along the lower side direction L. FIGS. 9(A) and (B) show the arrangement of the liquid crystal molecules 55 and 56 viewed in the lower side direction L when the voltage is not applied across the pixel electrode P on the substrate 41 and the common electrode on the substrate 42.

In the LCD panels A and D, the alignment layer of the upper glass substrate (the substrate 42 of the LCD panel A and the substrate 41 of the LCD panel D) is rubbed in the direction from the lower left region to the upper right region, and the alignment layer of the lower glass substrate (the substrate 41 of the LCD panel A and the substrate 42 of the LCD panel D) is rubbed in the direction from the upper left region to the lower right region. Thus, for the reason described with reference to the FIG.5, one end 55A of the liquid crystal molecule 55 contacts to the alignment layer of the upper substrate and the other end 55B separates from the surface of the alignment layer, and one end 56B of the liquid crystal molecule 56 contacts to the alignment layer of the lower substrate and the other end 56A separates from the surface of the alignment layer, as shown in the FIG. 9(A). When the voltage is applied across the pixel electrode P and the common electrode, the liquid crystal molecules 55 and 56 rotate in the counter clockwise direction 56, so that the user observing the LCD device along the direction L sees the liquid crystal molecule 55 in its axial direction 58, whereby the wide viewing angle providing the good contrast ratio is obtained in the lower side direction L.

In the LCD panels B and C, the alignment layer of the upper glass substrate (the substrate 41 of the LCD panel B and the substrate 42 of the LCD panel C) is rubbed in the direction from the upper right region to the lower left region, and the alignment layer of the lower glass substrate (the substrate 42 of the LCD panel B and the substrate 41 of the LCD panel C) is rubbed in the direction from the lower right region to the upper left region. Thus, for the reason described with reference to the FIG.5, one end 55B of the liquid crystal molecule 55 contacts to the alignment layer of the upper substrate and the other end 55A separates from the surface of the alignment layer, and one end 56A of the liquid crystal molecule 56 contacts to the alignment layer of the lower substrate and the other end 56B separates from the surface of the alignment layer, as shown in the FIG. 9(B). When the voltage is applied across the pixel electrode P and the opposing electrode, the liquid crystal molecules 55 and 56 rotate in the counter clockwise direction 56, so that the user observing the LCD device along the direction L sees the liquid crystal molecule 55 in the direction substantially perpendicular to the axial direction 58, whereby the wide viewing angle providing the good contrast ratio is not obtained in the lower side direction L. In the LCD panels B and C, the wide viewing angle providing the good contrast ratio is obtained in the upper side direction U. That is, in the left side LCD panels A and D, the wide viewing angle providing the good contrast ratio is obtained in the lower side direction L, while, in the right side LCD panels B and C, the wide viewing angle providing the good contrast ratio is obtained in the upper side direction U. But, this can be compensated by arranging a diffusion plate between the upper polarizer and the user.

Figure 10:
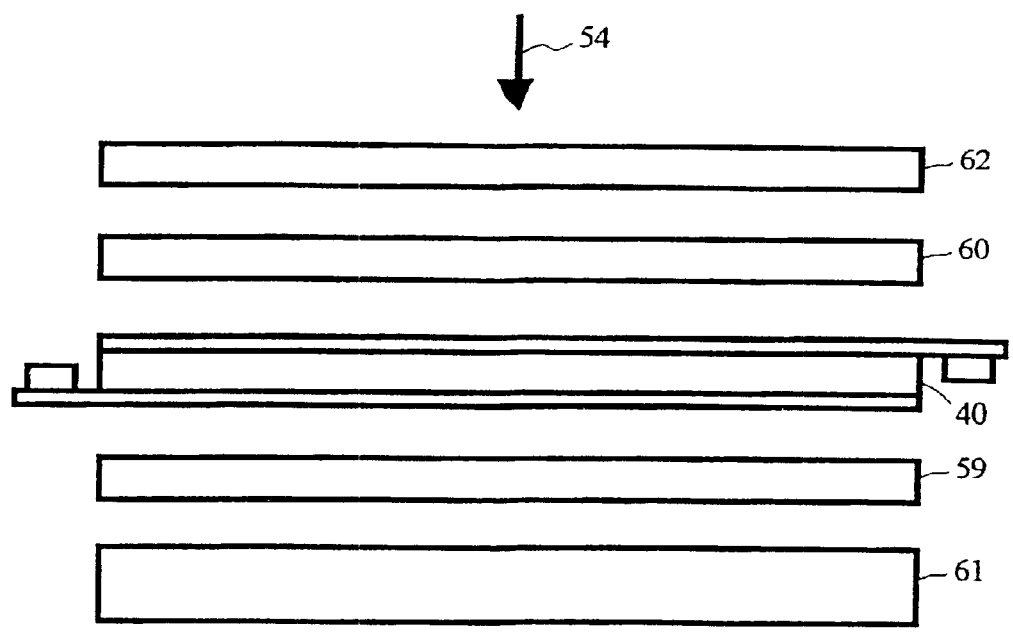
FIG. 10 shows the LCD device of the present invention using the tiling panel 40 of the first embodiment.
Figure 10:
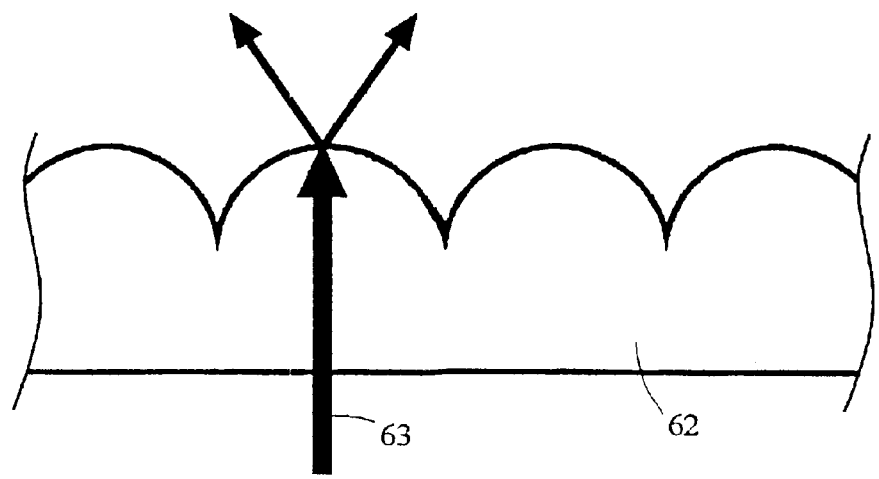

FIG. 10(A) shows the LCD device of the present invention using the tiling panel 40 of the first embodiment. A light source 61 is mounted to direct the light to the lower substrates of the four LCD panels A, B, C and D. Polarizer plates 59 and 60 are arranged at the upper side and the lower side of the tiling panel 40. Since the operation of the polarizer plates 59 and 60 is well known in the art, the detail description is not made. The diffusion plate 62 is mounted on the upper substrates of the four LCD panels A, B, C and D. The diffusion plate 62 diffuses the incident light 63 from the light source 61, as shown in the FIG. 10(B). By mounting the diffusion plate 62, the contrast ratio in the direction L is somewhat degraded in the left side LCD panels A and D, but the viewing angle in the direction L is improved in the right side LCD panels B and C, so that the viewing angle of the same degrees providing the contrast ratio of the same degree in the direction L is obtained in all the LCD panels A, B, C and D.

Next, the remarkable effect of the first embodiment is described. The first effect is that the present invention prevents the damage of the TFTs in the pixel regions on the pixel array glass substrate 41 due to the ESD in the prior LCD device, for the reason that all the alignment layers 50 in the LCD panels A, B, C and D of the present invention are rubbed in the direction from the corner at which both the horizontal short ring 43 and vertical short ring 43 exist, to the center point CT. In this manner, the present invention solves the first problem in the prior LCD device described before.

Figure 11:
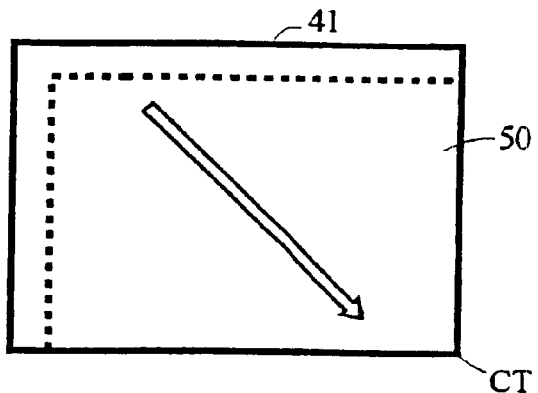
FIG. 11 shows the rubbing direction of the alignment layers 50 (FIG. 8) on the inside surface of the pixel array glass substrate 41 when the alignment layer 50 is viewed in a direction of an arrow 64 shown in the FIG. 8, and the rubbing direction of the alignment layer 51 (FIG. 8) on the inside surface of the opposing glass substrate 42 when the alignment layer 51 is viewed in a direction of an arrow 65 shown in the FIG. 8.
Figure 11:
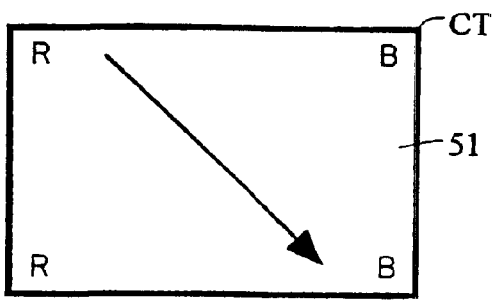
Figure 11:
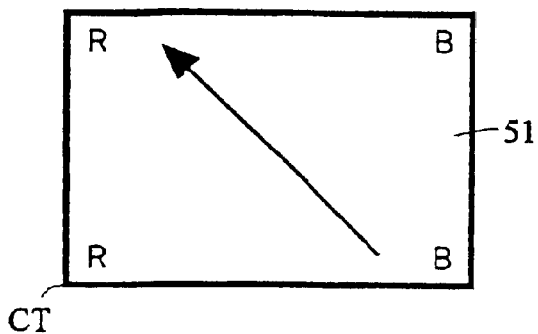

The second effect of the first embodiment is described with reference to FIG. 11. The FIG. 11 shows the rubbing direction of the alignment layers 50 (FIG. 8) on the inside surface of the pixel array glass substrate 41 when the alignment layer 50 is viewed in a direction of an arrow 64 shown in the FIG. 8, and the rubbing direction of the alignment layer 51 (FIG. 8) on the inside surface of the opposing glass substrate 42 when the alignment layer 51 is viewed in a direction of an arrow 65 shown in the FIG. 8. As described before, since all the alignment layers 50 in the LCD panels A, B, C and D are rubbed in the direction from the corner at which both the horizontal short ring 43 and vertical short ring 43 exist, to the center point CT, one kind of pixel array glass substrate 41 is required.

Figure 6:
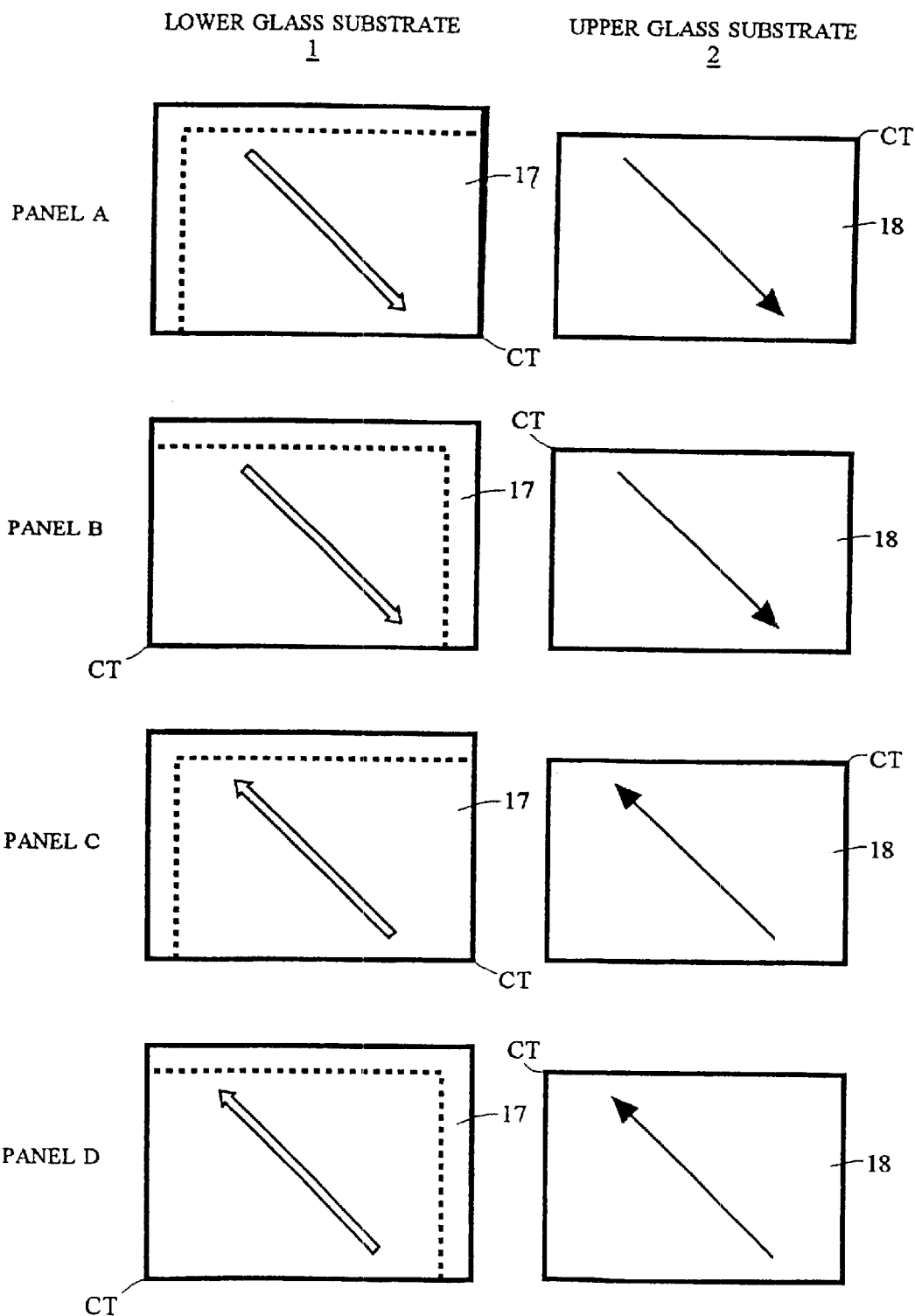
FIG. 6 shows the rubbing direction of the alignment layers 17 (FIG. 4) on the inside surface of the lower glass substrate 1 when the alignment layer 17 is viewed in a direction of an arrow 30 in the FIG. 4, and the rubbing direction of the alignment layer 18 (FIG. 4) on the inside surface of the upper glass substrate 2 when the alignment layer 18 is viewed in a direction of an arrow 31 in the FIG. 4.

In the case the color LCD display device, two kinds of rubbing direction are required, for the following reason. As shown in the FIG. 7, the left most color filter of each of the four LCD panels A, B, C and D is the Red color filter, and the right most color filter of each of the four LCD panels A, B, C and D is the Blue color filter to display the natural color image. In the LCD panels A and D, the alignment layer 51 which is formed above the color filter 49 is rubbed in the direction from the Red color filter side to the Blue color filter side. This rubbing direction is shown in the FIG. 11(B). In the LCD panels B and C, the alignment layer 51 which is formed above the color filter 49 is rubbed in the direction from the Blue color filter side to the Red color filter side. This rubbing direction is shown in the FIG. 11(C). In the case of the black/white LCD device without the color filters, one kind rubbing direction as shown in the FIG. 11(B) is required for all the alignment layers 51 of the four LCD panels A, B, C and D. In this manner, the present invention solves the second problem in the prior LCD device described with reference to the FIG. 6.

In the case that the LCD device of the tiling panel of the present invention is placed on a wall of the first floor, and the users at the second floor see the LCD device, it is desirable that the wide viewing angle providing the good contrast ratio is obtained in the upper side direction U, as shown in the FIG. 5(A). In this case, the rubbing direction of the alignment layers 50 and 51 of the LCD panels A and D can be changed, as follows, and the LCD panels B and C of the rubbing direction as shown in the FIG. 7 are used. Further, the diffusion plate 62 is not used.

In the upper left side LCD panel A, the alignment layer 50 on the pixel array transparent substrate 41 is rubbed in a direction from the lower right region to the upper left region, and the alignment layer 51 on the opposing transparent substrate 51 is rubbed in a direction from the upper right region to the lower left region.

In the lower left side LCD panel D, the alignment layer 50 on the pixel array transparent substrate 41 is rubbed in a direction from the upper right region to the lower left region, and the alignment layer 51 on the opposing transparent substrate 42 is rubbed in a direction from the lower right region to the upper left region.

The Second Embodiment of the Present Invention

Figure 12:
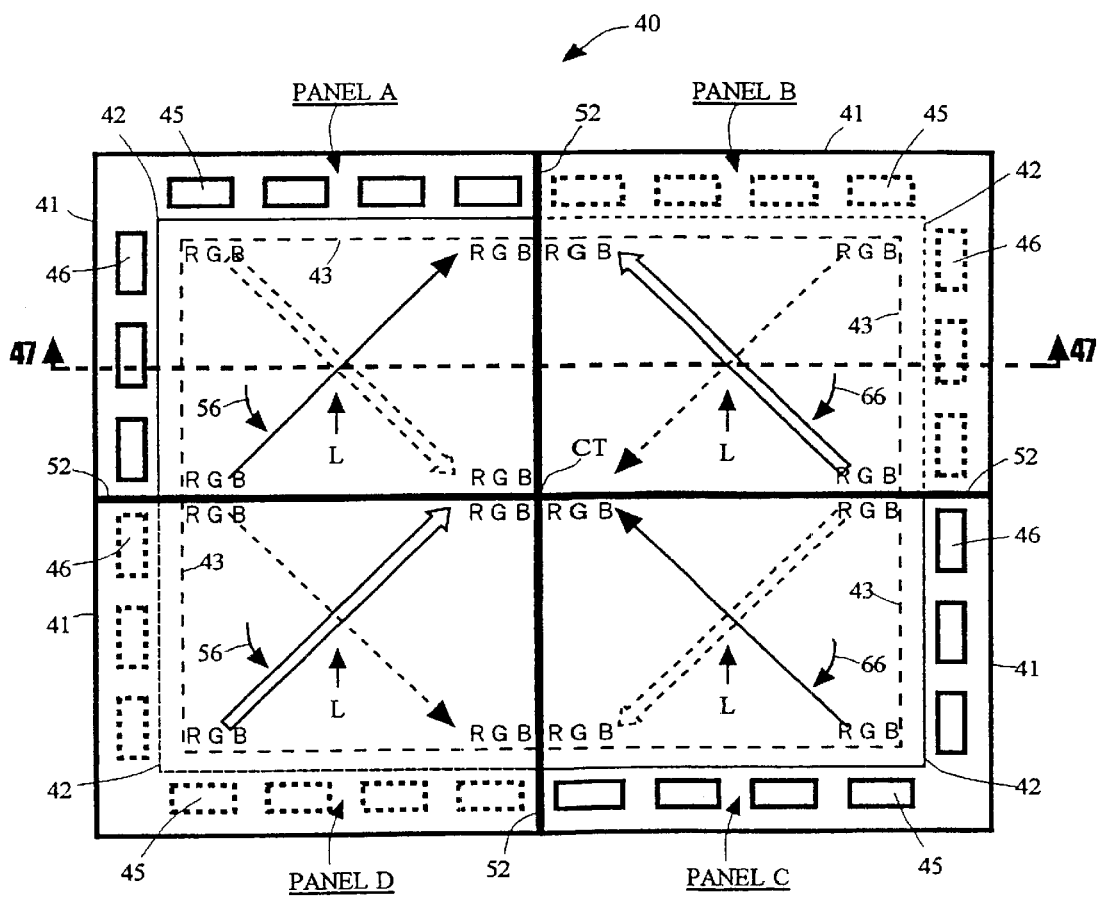
FIG. 12 shows the second embodiment of the color LCD device constituted by the tiling panel 40 in accordance with the present invention.

FIG. 12 shows the second embodiment of the color LCD device constituted by the tiling panel 40 in accordance with the present invention. The second embodiment realizes the wide viewing angle providing the good contrast ratio in the direction L, as shown in the FIG. 5(A), in all the four LCD panels A, B, C and D, without using the diffusion plate 62 of the first embodiment. The structure of the tiling panel 40 of the second embodiment is substantially the same as that of the tiling panel 40 of the first embodiment except the rubbing direction of the alignment layers of the upper right side LCD panel B and the lower right side LCD panel C, and rotating direction of the 90 degree twisted nematic liquid crystal material used in the upper right side LCD panel B and the lower right side LCD panel C. Therefore, the structure which is the same as that of the first embodiment is briefly described, and the structure of the second embodiment which differs from that of the first embodiment is described in detail. The same reference numbers as that of the first embodiment are used in the second embodiment. The cross section of the tiling panel 40 of the second embodiment along the lines 47—47 shown in the FIG. 12 is the same as that of the first embodiment shown in the FIG. 8.

The rubbing direction of the alignment layers 50 and 51, the liquid crystal material, and the viewing direction giving the wide viewing angle providing the good contrast ratio of the LCD panels A and D shown in the FIG. 12 is briefly described. The rubbing direction of the alignment layers 50 and 51 in the upper left side LCD panel A and the lower left side LCD panel D is the same as that of the LCD panels A and D shown in the FIG. 7.

That is, in the LCD panel A, the alignment layer 50 on the pixel array transparent substrate 41 is rubbed in a direction from the upper left region to the lower right region, and the alignment layer 51 on the opposing transparent substrate 42 is rubbed in a direction from the lower left region to the upper right region.

In the lower left side LCD panel D, the alignment layer 50 on the pixel array transparent substrate 41 is rubbed in a direction from the lower left region to the upper right region, and the alignment layer 51 on the opposing transparent substrate 42 is rubbed in a direction from the upper left region to the lower right region.

The liquid crystal material used in the two LCD panels A and D is the 90 degree twisted nematic liquid crystal material with a chiral material, or chiral dopant, which causes the liquid molecules to rotate in a counter clockwise direction 56.

The viewing direction giving the wide viewing angle providing the good contrast ratio of the LCD panels A and D is the direction L, as described before with reference to the FIG. 9(A).

Next, the rubbing direction of the alignment layers 50 and 51, the liquid crystal material, and the viewing direction giving the wide viewing angle providing the good contrast ratio of the LCD panels B and C shown in the FIG. 12 is described. The rubbing direction of the alignment layers 50 and 51 in the upper right side LCD panel B and the lower right side LCD panel C differs from that of the LCD panels B and C shown in the FIG. 7.

That is, in the LCD panel B, shown in the FIG. 12, the alignment layer 50 on the pixel array transparent substrate 41 is rubbed in the direction from the lower right region to the upper left region, and the alignment layer 51 on the opposing transparent substrate 42 is rubbed in a direction from the upper right region to the lower left region, In the LCD panel C, the alignment layer 50 on the pixel array transparent substrate 41 is rubbed in a direction from the upper right region to the lower left region, and the alignment layer 51 on the opposing transparent substrate 42 is rubbed in a direction from the lower right region to the upper left region.

By using the above rubbing direction in the LCD panels B and C, it becomes possible to use the twisted nematic liquid crystal material with a chiral material, or chiral dopant, which causes the liquid molecules to rotate in a clockwise direction 66, so that the wide viewing angle providing the good contrast ratio is obtained in the direction L, for the following reason.

Figure 13:
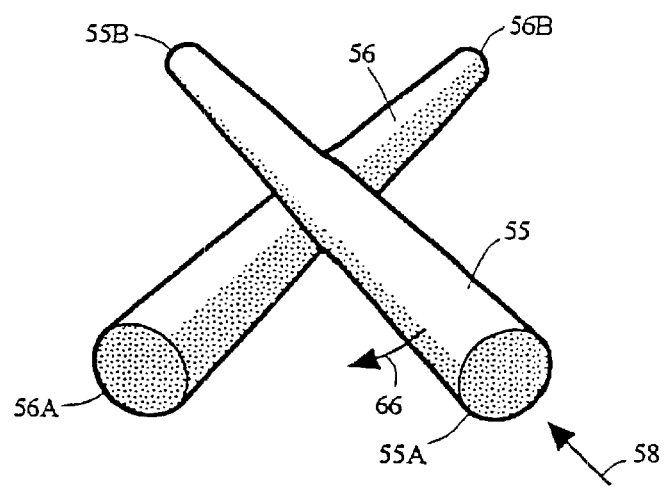
FIG. 13 shows the arrangement of the liquid crystal molecules 55 and 56 in the LCD panels B and C viewed in the lower side direction L when the voltage is not applied across the pixel electrode P and the common electrode.

FIG. 13 shows the arrangement of the liquid crystal molecules 55 and 56 in the LCD panels B and C viewed in the lower side direction L when the voltage is not applied across the pixel electrode P and the common electrode.

In the LCD panels B and C shown in the FIG. 12, the alignment layer of the upper glass substrate (the substrate 41 of the LCD panel B and the substrate 42 of the LCD panel C) is rubbed in the direction from the lower right region to the upper left region, and the alignment layer of the lower glass substrate (the substrate 42 of the LCD panel B and the substrate 41 of the LCD panel C) is rubbed in the direction from the upper right region to the lower left region. Thus, for the reason described with reference to the FIG. 5, one end 55A of the liquid crystal molecule 55 contacts to the alignment layer of the upper substrate and the other end 55B separates from the surface of the alignment layer, and one end 56B of the liquid crystal molecule 56 contacts to the alignment layer of the lower substrate and the other end 56A separates from the surface of the alignment layer, as shown in the FIG. 13. When the voltage is applied across the pixel electrode P and the common electrode, the liquid crystal molecules 55 and 56 rotate in the clockwise direction 66, so that the user observing the LCD device along the direction L sees the liquid crystal molecule 55 in its axial direction 58, whereby the wide viewing angle providing the good contrast ratio is obtained in the direction L.

The mounting scheme of the circuit modules 45 and 46 and the arrangement of the Red, Green and Blue color filters are the same as that of the first embodiment shown in the FIG. 7.

The remarkable effect of the second embodiment is described. The first effect of the second embodiment is that the present invention solves the damage of the TFTs in the pixel regions on the pixel array glass substrate 41 due to the ESD in the prior LCD device, for the reason that all the alignment layers 50 in the LCD panels A, B, C and D are rubbed in the direction from the corner at which one of or both the horizontal short ring 43 and vertical short ring 43 exist(s), to the center point CT or the opposing corner 67 (FIG. 14). In this manner, the present invention solves the first problem in the prior LCD device described before.

The second effect of the second embodiment is described with reference to FIG. 14. The FIG. 14 shows the rubbing direction of the alignment layers 50 (FIG. 8) on the inside surface of the pixel array glass substrate 41 when the alignment layer 50 is viewed in a direction of an arrow 64 shown in the FIG. 8, and the rubbing direction of the alignment layer 51 (FIG. 8) on the inside surface of the opposing glass substrate 42 when the alignment layer 51 is viewed in a direction of an arrow 65 shown in the FIG. 8. As described before, since all the alignment layers 50 in the LCD panels A, B, C and D are rubbed in the direction from the corner at which one of or both the horizontal short ring 43 and vertical short ring 43 exist(s), to the center point CT or the opposing corner 67, one kind of pixel array glass substrate 41 is required, and the two rubbing directions are required.

In the case the color LCD display device, two kinds of rubbing direction are required, for the reason described with reference to the FIG. 11. That is, as shown in the FIG. 12, the left most color filter of each of the four LCD panels A, B, C and D is the Red color filter, and the right most color filter of each of the four LCD panels A, B, C and D is the Blue color filter to display the natural color image. In the LCD panels A and D, the alignment layer 51 which is formed above the color filter 49 is rubbed in the direction from the Red color filter side to the Blue color filter side. This rubbing direction is shown in the FIG. 14(C). In the LCD panels B and C, the alignment layer 51 which is formed above the color filter 49 is rubbed in the direction from the Blue color filter side to the Red color filter side. This rubbing direction is shown in the FIG. 14(D). In the case of the black/white LCD device without the color filters, one kind rubbing direction as shown in the FIG. 14(C) is required for all the alignment layers 51 of the four LCD panels A, B, C and D. In this manner, the present invention solves the second problem in the prior LCD device described with reference to the FIG. 6.

In the case that the LCD device of the tiling panel of the present invention is placed on a wall of the first floor, and the users at the height of the second floor see the LCD device, it is desirable that the wide viewing angle providing the good contrast ratio is obtained in the upper side direction U, as shown in the FIG. 5(A). In this case, the rubbing directions of the alignment layers 50 and 51 of the LCD panels A, B, C and D which are opposite to that shown in the FIG. 12 are used, as follows.

In the LCD panel A, the alignment layer 50 on the pixel array transparent substrate 41 is rubbed in a direction from the lower right region to the upper left region, and the alignment layer 51 on the opposing transparent substrate 51 is rubbed in a direction from the upper right region to the lower left region.

In the lower left side LCD panel D, the alignment layer 50 on the pixel array transparent substrate 41 is rubbed in a direction from the upper right region to the lower left region, and the alignment layer 51 on the opposing transparent substrate 42 is rubbed in a direction from the lower right corner to the upper left region.

In the upper right LCD panel B, the alignment layer 50 on the pixel array transparent substrate 41 is rubbed in the direction from the upper left region to the lower right region, and the alignment layer 51 on the opposing transparent substrate 42 is rubbed in a direction from the lower left region to the upper right region, In the LCD panel C, the alignment layer 50 on the pixel array transparent substrate 41 is rubbed in a direction from the lower left region to the upper right region, and the alignment layer 51 on the opposing transparent substrate 42 is rubbed in a direction from the upper left region to the lower right region.

The Third Embodiment of the Present Invention

The FIG. 15 shows the third embodiment of the color LCD device constituted by the tiling panel 40 in accordance with the present invention. The tiling panel 40 of the third embodiment includes the upper left side LCD panel A of the first embodiment shown in the FIG. 7 as the left side LCD panel, and the upper right side LCD panel B of the first embodiment shown in the FIG. 7 as the right side LCD panel. Therefore, the rubbing direction of the alignment layer 50 of the pixel array glass substrate 41 and the alignment layer 51 of the opposing glass substrate 42 of each of the LCD panels A and B is the same as that of the first embodiment shown in the FIG. 7. Further, the tiling panel shown in the FIG. 15 includes the color filters and the circuits modules 45 and 46 shown in the FIG. 7. But the circuit modules 45 and 46 are not shown in the FIG. 15 for simplifying the drawing. The same reference numbers as that of the first embodiment are used in the third embodiment.

In the case that the LCD device of the tiling panel of the present invention is placed on a wall of the first floor, and the users at the height of the second floor see the LCD device, it is desirable that the wide viewing angle providing the good contrast ratio is obtained in the upper side direction U, as shown in the FIG. 5(A). In this case, the rubbing directions of the alignment layers 50 and 51 of the LCD panels A, B, C and D which are opposite to that shown in the FIG. 15 are used, as described before.

In the left side LCD panel A, the short ring 43 extends along a top edge, a left edge and a bottom edge of the pixel array glass substrate 41 including the pixel array. In the right side LCD panel B, the short ring 43 extends along a top edge, a right edge and a bottom edge of the pixel array glass substrate 41 including the pixel array.

A right edge of the left side LCD panel A is bonded to a left edge of the right side LCD panel B at the bonding region 52, to bond the substrate 41 of the LCD panel A and the substrate 42 of the LCD panel B and to bond the substrate 42 of the LCD panel A and the substrate 41 of the LCD panel B.

The liquid crystal material in the LCD panels A and B is the 90 degree twisted nematic liquid crystal material with the chiral material causing the liquid molecules to rotate in the counter clockwise direction 56.

As shown in the FIG. 10(A), the light source 61 is mounted to direct the light to the tiling panel 40 and the diffusion plate 62 is mounted on the upper substrates of the LCD panels A and B.

In the LCD panel A, the data line drivers (45) connected to the data lines are mounted on an area of substrate 41 adjacent to at least one of the top edge and the bottom edge, and the gate line drivers (46) connected to the gate lines are mounted on an area of the substrate 41 adjacent to the left edge. In the LCD panel B, the data line drivers (45) connected to the data lines are mounted on an area of the substrate 41 adjacent to at least one of the top edge and the bottom edge, and the gate line drivers (46) connected to the gate lines are mounted on an area of the substrate 41 adjacent to the right edge.

The Fourth Embodiment of the Present Invention

The FIG. 16 shows the fourth embodiment of the color LCD device constituted by the tiling panel 40 in accordance with the present invention. The tiling panel 40 of the fourth embodiment includes the upper left LCD panel A of the first embodiment shown in the FIG. 7 as the upper side LCD panel A, and the lower left side LCD panel D of the first embodiment shown in the FIG. 7 as the lower side LCD panel. Therefore, the rubbing direction of the alignment layer 50 of the pixel array glass substrate 41 and the alignment layer 51 of the opposing glass substrate 42 of each of the LCD panels A and D is the same as that of the first embodiment shown in the FIG. 7. Further, the tiling panel 40 shown in the FIG. 16 includes the color filters and the circuits modules 45 and 46 shown in the FIG. 7. But the circuit modules 45 and 46 are not shown in the FIG. 16 for simplifying the drawing. The same reference numbers as that of the first embodiment are used in the fourth embodiment.

In the case that the LCD device of the tiling panel of the present invention is placed on a wall of the first floor, and the users at the height of the second floor see the LCD device, it is desirable that the wide viewing angle providing the good contrast ratio is obtained in the upper side direction U, as shown in the FIG. 5(A). In this case, the rubbing directions of the alignment layers 50 and 51 of the LCD panels A, B, C and D which are opposite to that shown in the FIG. 16 are used, as follows.

In the upper side LCD panel A, the short ring 43 extends along a left edge, a top edge and a right edge of the pixel array glass substrate 41 including the pixel array. In the lower side LCD panel D, the short ring 43 extends along a left edge, a bottom edge and a right edge of the pixel array glass substrate 41 including the pixel array.

A bottom edge of the upper side LCD panel A is bonded to a top edge of the lower side LCD panel D at the bonding region 52, to bond the substrate 41 of the LCD panel A and the substrate 42 of the LCD panel D and to bond the substrate 42 of the LCD panel A and the substrate 41 of the LCD panel D.

The liquid crystal material in the LCD panels A and D is the 90 degree twisted nematic liquid crystal material with the chiral material causing the liquid molecules to rotate in the counter clockwise direction 56.

In the LCD panel A, the data line drivers (45) connected to the data lines are mounted on an area of substrate 41 adjacent to the top edge, and the gate line drivers (46) connected to the gate lines are mounted on an area of the substrate 41 adjacent to at least one of the left edge and the right edge. In the LCD panel D, the data line drivers (45) connected to the data lines are mounted on an area of the substrate 41 adjacent to the bottom edge, and the gate line drivers (46) connected to the gate lines are mounted on an area of the substrate 41 adjacent to at least one of the left edge and the right edge.

The Fifth Embodiment of the Present Invention

The FIG. 17 shows the fifth embodiment of the color LCD device constituted by the tiling panel 40 in accordance with the present invention. The tiling panel 40 of the fifth embodiment includes the upper left side LCD panel A of the second embodiment shown in the FIG. 12 as the left side LCD panel, and the upper right side LCD panel B of the second embodiment shown in the FIG. 12 as the right side LCD panel. Therefore, the rubbing direction of the alignment layer 50 of the pixel array glass substrate 41 and the alignment layer 51 of the opposing glass substrate 42 of each of the LCD panels A and B is the same as that of the second embodiment shown in the FIG. 12. Further, the tiling panel shown in the FIG. 17 includes the color filters and the circuits modules 45 and 46 shown in the FIG. 12. But the circuit modules 45 and 46 are not shown in the FIG. 17 for simplifying the drawing. The same reference numbers as that of the first embodiment are used in the fifth embodiment.

In the case that the LCD device of the tiling panel of the present invention is placed on a wall of the first floor, and the users at the height of the second floor see the LCD device, it is desirable that the wide viewing angle providing the good contrast ratio is obtained in the upper side direction U, as shown in the FIG. 5(A). In this case, the rubbing directions of the alignment layers 50 and 51 of the LCD panels A, B, C and D which are opposite to that shown in the FIG. 17 are used, as described before.

In the left side LCD panel A, the short ring 43 extends along a top edge, a left edge and a bottom edge of the pixel array glass substrate 41 including the pixel array. In the right side LCD panel B, the short ring 43 extends along a top edge, a right edge and a bottom edge of the pixel array glass substrate 41 including the pixel array.

A right edge of the left side LCD panel A is bonded to a left edge of the right side LCD panel B at the bonding region 52, to bond the substrate 41 of the LCD panel A and the substrate 42 of the LCD panel B and to bond the substrate 42 of the LCD panel A and the substrate 41 of the LCD panel B.

The liquid crystal material in the LCD panels A is the twisted nematic liquid crystal material with the chiral material causing the liquid molecules to rotate in the counter clockwise direction 56. The liquid crystal material in the LCD panels B is the twisted nematic liquid crystal material with the chiral material causing the liquid molecules to rotate in the clockwise direction 66.

In the LCD panel A, the data line drivers (45) connected to the data lines are mounted on an area of substrate 41 adjacent to at least one of the top edge and the bottom edge, and the gate line drivers (46) connected to the gate lines are mounted on an area of the substrate 41 adjacent to the left edge. In the LCD panel B, the data line drivers (45) connected to the data lines are mounted on an area of the substrate 41 adjacent to at least one of the top edge and the bottom edge, and the gate line drivers (46) connected to the gate lines are mounted on an area of the substrate 41 adjacent to the right edge.

The Sixth Embodiment of the Present Invention

The first through fifth embodiments of the LCD device of the present invention relates to the LCD device operated in the twisted nematic mode. The sixth embodiment of the LCD device of the present invention relates to the LCD device operated in a polymer dispersed (PD) mode which uses a polymer dispersed liquid crystal material. The PD mode does not requires the alignment layers and the rubbing thereof. Therefore, in the sixth embodiment, the LCD panels A, B, C and D, which are the LCD panels A, B, C and D of the first and second embodiments shown in the FIGS. 7 and 12, from which the alignment layers 50 and 51 are removed, are used. Further, the LCD panels A and B, which are the LCD panels A and B of the third and fifth embodiments shown in the FIGS. 15 and 17, from which the alignment layers 50 and 51 are removed, are used. Further, the LCD panels A and D, which are the LCD panels A and D of the fourth embodiment shown in the FIG. 16, from which the alignment layers 50 and 51 are removed, are used.

The present invention solves the first problem in the prior LCD device, that the TFTs on the LCD panels of the tiling panel are damaged due to the ESD during the rubbing process and other process, and the second problem in the prior LCD device that various kinds of lower glass substrate 1 and various kinds of upper glass substrate 2 are required to form the tiling panel.

While the invention has been particularly shown and described with respect to preferred embodiments thereof, it will be understood by those skilled in the art that the foregoing and other changes in form and details may be made therein without departing from the spirit and scope of the invention.

Having thus described my invention, what I claim as new, and desire to secure by Letters Patent is:

1. A liquid crystal display (LCD) device comprising:
   a left side LCD panel including a pixel array substrate on which a pixel array and a short ring are formed, and an opposing substrate on which a common electrode is formed; and
   a right side LCD panel including a pixel array substrate on which a pixel array and a short ring are formed, and an opposing substrate on which a common electrode is formed;
   wherein one substrate of said pixel array substrate and said opposing substrate of said left side LCD panel is a lower substrate, and the other substrate is an upper substrate,
   wherein one substrate of said pixel array substrate and said opposing substrate of said right side LCD panel is an upper substrate, and the other substrate is a lower substrate, and
   wherein said one substrate of said left side LCD panel is the pixel array substrate if said one substrate of said right side LCD panel is the opposing substrate, and conversely said one substrate of said left side LCD panel is the opposing substrate if said one substrate of said right side LCD panel is the pixel array substrate;
   wherein a right edge of said left side LCD panel is bonded to a left edge of said right side LCD panel, to bond said one substrate of said left side LCD panel and said the other substrate of said right side LCD panel and, to bond said the other substrate of said left side LCD panel and said one substrate of said right side LCD panel.

2. The LCD device according to claim 1, wherein said short ring on said pixel array substrate of said left side LCD panel extends along a left edge and at least one of a top edge and a bottom edge,
   wherein said short ring on said pixel array substrate of said right side LCD panel extends along a right edge and at least one of a top edge and a bottom edge,
   wherein each of said pixel arrays in said left side LCD panel and said right side LCD panel includes gate lines extending in parallel to said top or bottom edge, data lines extending in parallel to said left or right edge, and a pixel region formed at each of cross points of said gate lines and said data lines, wherein data line drivers are connected to said data lines on an area of said left side LCD panel adjacent to at least one of said top edge and said bottom edge, and gate line drivers are connected to said gate lines on an area of said left side LCD panel adjacent to said left edge, and wherein data line drivers are connected to said data lines on an area of said right side LCD panel adjacent to at least one of said top edge and said bottom edge, and gate line drivers are connected to said gate lines on an area of said right side LCD panel adjacent to said right edge.

3. A LCD device comprising:

an upper side LCD panel including a pixel array substrate on which a pixel array and a short ring are formed, and an opposing substrate on which a common electrode is formed; and a lower side LCD panel including a pixel array substrate on which a pixel array and a short ring are formed, and an opposing substrate on which a common electrode is formed;

wherein one substrate of said pixel array substrate and said opposing substrate of said upper side LCD panel is a lower substrate, and the other substrate is an upper substrate, wherein one substrate of said pixel array substrate and said opposing substrate of said lower side LCD panel is an upper substrate, and the other substrate is a lower substrate, and wherein said one substrate of said upper side LCD panel is the pixel array substrate if said one substrate of said lower side LCD panel is the opposing substrate, and conversely said one substrate of said upper side LCD panel is the opposing substrate if said one substrate of said lower side LCD panel is the pixel array substrate;

wherein a bottom edge of said upper side LCD panel is bonded to a top edge of said lower side LCD panel, to bond said one substrate of said upper side LCD panel and said the other substrate of said lower side LCD panel, and to bond said the other substrate of said upper side LCD panel and said one substrate of said lower side LCD panel.

4. The LCD device according to claim 3, wherein said short ring on said pixel array substrate of said upper side LCD panel extends along a top edge and at least one of a left edge and a right edge, wherein said short ring on said pixel array substrate of said lower side LCD panel extends along a bottom edge and at least one of a left edge and a right edge, wherein each of said pixel arrays in said upper side LCD panel and said lower side LCD panel includes gate lines extending in parallel to said top or bottom edge, data lines extending in parallel to said left or right edge, and a pixel region formed at each of cross points of said gate lines and said data lines, wherein data line drivers are connected to said data lines on an area of said upper side LCD panel adjacent to said top edge, and gate line drivers are connected to said gate lines on an area of said upper side LCD panel adjacent to at least one of said left edge and said right edge, and wherein data line drivers are connected to said data lines on an area of said lower side LCD panel adjacent to said bottom edge, and gate line drivers are connected to said gate lines on an area of said lower side LCD panel adjacent to at least one of said left edge and said right edge.

5. A LCD device comprising:

an upper left side LCD panel including a pixel array substrate on which a pixel array, and a short ring extending along a top edge and a left edge are formed, and an opposing substrate on which a common electrode is formed;

an upper right side LCD panel including a pixel array substrate on which a pixel array, and a short ring extending along a top edge and a right edge are formed, and an opposing substrate on which a common electrode is formed;

a lower right side LCD panel including a pixel array substrate on which a pixel array, and a short ring extending along a bottom edge and a right edge are formed, and an opposing substrate on which a common electrode is formed; and a lower left side LCD panel including a pixel array substrate on which a pixel array, and a short ring extending along a bottom edge and a left edge are formed, and an opposing substrate on which a common electrode is formed;

wherein one substrate of said pixel array substrate and said opposing substrate of said upper left side LCD panel is a lower substrate, and the other substrate is an upper substrate, wherein one substrate of said pixel array substrate and said opposing substrate of said upper right side LCD panel is an upper substrate, and the other substrate is a lower substrate, wherein said one substrate of said upper left side LCD panel is the pixel array substrate if said one substrate of said upper right side LCD panel is the opposing substrate, and conversely said one substrate of said upper left side LCD panel is the opposing substrate if said one substrate of said upper right side LCD panel is the pixel array substrate;

wherein one substrate of said pixel array substrate and said opposing substrate of said lower right side LCD panel is a lower substrate, and the other substrate is an upper substrate, wherein one substrate of said pixel array substrate and said opposing substrate of said lower left side LCD panel is an upper substrate, and the other substrate is a lower substrate, wherein said one substrate of said lower right side LCD panel is the pixel array substrate if said one substrate of said lower left side LCD panel is the opposing substrate, and conversely said one substrate of said lower right side LCD panel is the opposing substrate if said one substrate of said lower left side LCD panel is the pixel array substrate;

wherein a right edge of said upper left side LCD panel is bonded to a left edge of said upper right side LCD panel, to bond said one substrate of said upper left side LCD panel and said the other substrate of said upper right side LCD panel, and to bond said the other substrate of said upper left side LCD panel and said one substrate of said upper right side LCD panel, wherein a bottom edge of said upper right side LCD panel is bonded to a top edge of said lower right side LCD panel, to bond said one substrate of said upper right side LCD panel and said the other substrate of said lower right side LCD panel, and to bond said the other substrate of said upper right side LCD panel and said one substrate of said lower right side LCD panel, wherein a left edge of said lower right side LCD panel is bonded to a right edge of said lower left side LCD panel, to bond said one substrate of said lower right side LCD panel and said the other substrate of said lower left side LCD panel, and to bond said the other substrate of said lower right side LCD panel and said one substrate of said lower left side LCD panel, and wherein a top edge of said lower left side LCD panel is bonded to a bottom edge of said upper left side LCD panel, to bond said one substrate of said lower right side LCD panel and said the other substrate of said upper left side LCD panel, and to bond said the other substrate of said lower left side LCD panel and said one substrate of said upper left side LCD panel.

6. The LCD device according to claim 5, wherein each of said pixel arrays in said upper left side LCD panel, said upper right side LCD panel, said lower left side LCD panel and said lower left side LCD panel includes gate lines extending in parallel to said top or bottom edge, data lines extending in parallel to said left or right edge, and a pixel region formed at each of cross points of said gate lines and said data lines, wherein data line drivers are connected to said data lines on an area of said upper left side LCD panel adjacent to said top edge, and gate line drivers are connected to said gate lines on an area of said upper left side LCD panel adjacent to said left edge, wherein data line drivers are connected to said data lines on an area of said upper right side LCD panel adjacent to said top edge, and gate line drivers are connected to said gate lines on an area of said upper right side LCD panel adjacent to said right edge, wherein data line drivers are connected to said data lines on an area of said lower right side LCD panel adjacent to said bottom edge, and gate line drivers are connected to said gate lines on an area of said lower right side LCD panel adjacent to said right edge, and wherein data line drivers are connected to said data lines on an area of said lower left side LCD panel adjacent to said bottom edge, and gate line drivers are connected to said gate lines on an area of said lower left side LCD panel adjacent to said left edge.

7. A LCD device comprising:
a left side LCD panel including a pixel array substrate on which a pixel array, a short ring and an alignment layer are formed, and an opposing transparent glass substrate on which a common electrode and an alignment layer are formed; and
a right side LCD panel including a pixel array substrate on which a pixel array, a short ring and an alignment layer are formed, and an opposing transparent substrate on which a common electrode and an alignment layer are formed;
wherein one substrate of said pixel array substrate and said opposing substrate of said left side LCD panel is a lower substrate, and the other substrate is an upper substrate,
wherein one substrate of said pixel array substrate and said opposing substrate of said right side LCD panel is an upper substrate, and the other substrate is a lower substrate, wherein said one substrate of said left side LCD panel is the pixel array substrate if said one substrate of said right side LCD panel is the opposing substrate, and conversely said one substrate of said left side LCD panel is the opposing substrate if said one substrate of said right side LCD panel is the pixel array substrate;

wherein a right edge of said left side LCD panel is bonded to a left edge of said right side LCD panel, to bond said one substrate of said left side LCD panel and said the other substrate of said right side LCD panel, and to bond said the other substrate of said left side LCD panel and said one substrate of said right side LCD panel, wherein said alignment layer on said pixel array substrate of said left side LCD panel is rubbed in a direction from an upper left region to a lower right region of said left side LCD panel, and said alignment layer on said opposing substrate of said left side LCD panel is rubbed in a direction from a lower left region to an upper right region, and wherein said alignment layer on said pixel array substrate of said right side LCD panel is rubbed in a direction from an upper right region to a lower left region of said right side LCD panel, and said alignment layer on said opposing substrate of said right side LCD panel is rubbed in a direction from a lower right region to an upper left region.

8. The LCD device according to claim 7, wherein a liquid crystal material in said left side LCD panel and said right side LCD panel is a nematic liquid crystal material with a chiral material causing liquid molecules to twist in a counter clockwise direction.

9. The LCD device according to claim 8, wherein color filter is formed on said opposing substrates of said left side LCD panel and said right side LCD panel.

10. The LCD device according to claim 7, wherein a light source is mounted to direct the light to said lower substrates of said right side LCD panel and said left side LCD panel, and a diffusion plate is mounted on said upper substrates of said right side LCD panel and said left side LCD panel.

11. A LCD device comprising:
a left side LCD panel including a pixel array substrate on which a pixel array, a short ring and an alignment layer are formed, and an opposing transparent glass substrate on which a common electrode and an alignment layer are formed; and
a right side LCD panel including a pixel array substrate on which a pixel array, a short ring and an alignment layer are formed, and an opposing transparent substrate on which a common electrode and an alignment layer are formed;
wherein one substrate of said pixel array substrate and said opposing substrate of said left side LCD panel is a lower substrate, and the other substrate is an upper substrate,
wherein one substrate of said pixel array substrate and said opposing substrate of said right side LCD panel is an upper substrate, and the other substrate is a lower substrate,
wherein said one substrate of said left side LCD panel is the pixel array substrate if said one substrate of said right side LCD panel is the opposing substrate, and conversely said one substrate of said left side LCD panel is the opposing substrate if said one substrate of said right side LCD panel is the pixel array substrate;
wherein a right edge of said left side LCD panel is bonded to a left edge of said right side LCD panel, to bond said one substrate of said left side LCD panel and said the other substrate of said right side LCD panel, and to bond said the other substrate of said left side LCD panel and said one substrate of said right side LCD panel, wherein said alignment layer on said pixel array substrate of said left side LCD panel is rubbed in a direction from a lower right region to an upper left region of said left side LCD panel, and said alignment layer on said opposing substrate of said left side LCD panel is rubbed in a direction from an upper right region to a lower left region, and wherein said alignment layer on said pixel array substrate of said right side LCD panel is rubbed in a direction from upper right region to a lower left region of said right side LCD panel, and said alignment layer on said opposing substrate of said right side LCD panel is rubbed in a direction from a lower right region to an upper left region.

12. The LCD device according to claim 11, wherein a liquid crystal material in said left side LCD panel and said right side LCD panel is a nematic liquid crystal material with a chiral material causing liquid molecules to twist in a counter clockwise direction.

13. The LCD device according to claim 12, wherein a color filter is formed on said opposing substrates of said left side LCD panel and said right side LCD panel.

14. The LCD device according to claim 13, wherein said short ring on said pixel array substrate of said left side LCD panel extends along a left edge and at least one of a top edge and a bottom edge, wherein said short ring on said pixel array substrate of said right side LCD panel extends along a right edge and at least one of a top edge and a bottom edge, wherein each of said pixel arrays in said left side LCD panel and said right side LCD panel includes gate lines extending in parallel to said top or bottom edge, data lines extending in parallel to said left or right edge, and a pixel region formed at each of cross points of said gate lines and said data lines, wherein data line drivers are connected to said data lines on an area of said left side LCD panel adjacent to at least one of said top edge and said bottom edge, and gate line drivers are connected to said gate lines on an area of said left side LCD panel adjacent to said left edge, and wherein data line drivers are connected to said data lines on an area of said right side LCD panel adjacent to at least one of said top edge and said bottom edge, and gate line drivers are connected to said gate lines on an area of said right side LCD panel adjacent to said right edge.

15. A LCD device comprising:

an upper side LCD panel including a pixel array substrate on which a pixel array, a short ring and an alignment layer are formed, and an opposing transparent substrate on which a common electrode and an alignment layer are formed; and a lower side LCD panel including a pixel array substrate on which a pixel array, a short ring and an alignment layer are formed, and an opposing substrate on which a common electrode and an alignment layer are formed;

wherein one substrate of said pixel array substrate and said opposing substrate of said upper side LCD panel is a lower substrate, and the other substrate is an upper substrate, wherein one substrate of said pixel array substrate and said opposing substrate of said lower side LCD panel is an upper substrate, and the other substrate is a lower substrate, wherein said one substrate of said upper side LCD panel is the pixel array substrate if said one substrate of said lower side LCD panel is the opposing substrate, and conversely said one substrate of said upper side LCD panel is the opposing substrate if said one substrate of said lower side LCD panel is the pixel array substrate;

wherein a bottom edge of said upper side LCD panel is bonded to a top edge of said lower side LCD panel, to bond said one substrate of said upper side LCD panel and said the other substrate of said lower side LCD panel, and to bond said the other substrate of said upper side LCD panel and said one substrate of said lower side LCD panel, wherein said alignment layer on said pixel array substrate of said upper side LCD panel is rubbed in a direction from an upper left region to a lower right region of said upper side LCD panel, and said alignment layer on said opposing substrate of said upper side LCD panel is rubbed in a direction from a lower left region to an upper right region, and wherein said alignment layer on said pixel array substrate of said lower side LCD panel is rubbed in a direction from a lower left region to an upper right region of said lower side LCD panel, and said alignment layer on said opposing substrate of said lower side LCD panel is rubbed in a direction from an upper left region to a lower right region.

16. The LCD device according to claim 15, wherein a liquid crystal material in said upper side LCD panel and said lower side LCD panel is a nematic liquid crystal material with a chiral material causing liquid molecules to twist in a counter clockwise direction.

17. The LCD device according to claim 16, wherein a color filter is formed on said opposing substrates of said upper left side LCD panel, said upper right side LCD panel, said lower right side LCD panel and said lower left side LCD panel.

18. The LCD device according to claim 17, wherein said short ring on said pixel array substrate of said upper side LCD panel extends along a top edge and at least one of a left edge and a right edge, wherein said short ring on said pixel array substrate of said lower side LCD panel extends along a bottom edge and at least one of a left edge and a right edge, wherein each of said pixel arrays in said upper side LCD panel and said lower side LCD panel includes gate lines extending in parallel to said top or bottom edge, data lines extending in parallel to said left or right edge, and a pixel region formed at each of cross points of said gate lines and said data lines, wherein data line drivers are connected to said data lines on an area of said upper side LCD panel adjacent to said top edge, and gate line drivers are connected to said gate lines on an area of said upper side LCD panel adjacent to at least one of said left edge and said right edge, and wherein data line drivers are connected to said data lines on an area of said lower side LCD panel adjacent to said bottom edge, and gate line drivers are connected to said gate lines on an area of said lower side LCD panel adjacent to at least one of said left edge and said right edge.

19. A LCD device comprising:

an upper side LCD panel including a pixel array substrate on which a pixel array, a short ring and an alignment layer are formed, and an opposing transparent substrate on which a common electrode and an alignment layer are formed; and a lower side LCD panel including a pixel array substrate on which a pixel array, a short ring and an alignment layer are formed, and an opposing substrate on which a common electrode and an alignment layer are formed;

wherein one substrate of said pixel array substrate and said opposing substrate of said upper side LCD panel is a lower substrate, and the other substrate is an upper substrate, wherein one substrate of said pixel array substrate and said opposing substrate of said lower side LCD panel is an upper substrate, and the other substrate is a lower substrate, wherein said one substrate of said upper side LCD panel is the pixel array substrate if said one substrate of said lower side LCD panel is the opposing substrate, and conversely said one substrate of said upper side LCD panel is the opposing substrate if said one substrate of said lower side LCD panel is the pixel array substrate;

wherein a bottom edge of said upper side LCD panel is bonded to a top edge of said lower side LCD panel, to bond said one substrate of said upper side LCD panel and said the other substrate of said lower side LCD panel, and to bond said the other substrate of said upper side LCD panel and said one substrate of said lower side LCD panel, wherein said alignment layer on said pixel array substrate of said upper side LCD panel is rubbed in a direction from a lower right region to an upper left region of said upper side LCD panel, and said alignment layer on said opposing substrate of said upper side LCD panel is rubbed in a direction from an upper right region to a lower left region, and wherein said alignment layer on said pixel array substrate of said lower side LCD panel is rubbed in a direction from an upper right region to a lower left region of said lower side LCD panel, and said alignment layer on said opposing substrate of said lower side LCD panel is rubbed in a direction from a lower right region to an upper left region.

20. The LCD device according to claim 19, wherein a liquid crystal material in said upper side LCD panel and said lower side LCD panel is a nematic liquid crystal material with a chiral material causing liquid molecules to twist in a counter clockwise direction.

21. The LCD device according to claim 20, wherein a color filter is mounted on said opposing substrates of said upper side LCD panel and said lower side LCD panel.

22. The LCD device according to claim 21, wherein said short ring on said pixel array substrate of said upper side LCD panel extends along a top edge and at least one of a left edge and a right edge, wherein said short ring on said pixel array substrate of said lower side LCD panel extends along a bottom edge and at least one of a left edge and a right edge, wherein each of said pixel arrays in said upper side LCD panel and said lower side LCD panel includes gate lines extending in parallel to said top or bottom edge, data lines extending in parallel to said left or right edge, and a pixel region formed at each of cross points of said gate lines and said data lines, wherein data line drivers are connected to said data lines on an area of said upper side LCD panel adjacent to said top edge, and gate line drivers are connected to said gate lines on an area of said upper side LCD panel adjacent to at least one of said left edge and said right edge, and wherein data line drivers are connected to said data lines on an area of said lower side LCD panel adjacent to said bottom edge, and gate line drivers are connected to said gate lines on an area of said lower side LCD panel adjacent to at least one of said left edge and said right edge.

23. A LCD device comprising:

an upper left side LCD panel including a pixel array substrate on which a pixel array, a short ring extending along a top edge and a left edge and an alignment layer are formed, and an opposing substrate on which a common electrode and an alignment layer are formed;

an upper right side LCD panel including a pixel array substrate on which a pixel array, a short ring extending along a top edge and a right edge and an alignment layer are formed, and an opposing substrate on which a common electrode and an alignment layer are formed;

a lower right side LCD panel including a pixel array substrate on which a pixel array, a short ring extending along a bottom edge and a right edge and an alignment layer are formed, and an opposing substrate on which a common electrode and an alignment layer are formed; and a lower left side LCD panel including a pixel array substrate on which a pixel array, a short ring extending along a bottom edge and a left edge and an alignment layer are formed, and an opposing substrate on which a common electrode and an alignment layer are formed;

wherein one substrate of said pixel array substrate and said opposing substrate of said upper left side LCD panel is a lower substrate, and the other substrate is an upper substrate, wherein one substrate of said pixel array substrate and said opposing substrate of said upper right side LCD panel is an upper substrate, and the other substrate is a lower substrate, wherein said one substrate of said upper left side LCD panel is the pixel array substrate if said one substrate of said upper right side LCD panel is the opposing substrate, and conversely said one substrate of said upper left side LCD panel is the opposing substrate if said one substrate of said upper right side LCD panel is the pixel array substrate;

wherein one substrate of said pixel array substrate and said opposing substrate of said lower right side LCD panel is a lower substrate, and the other substrate is an upper substrate, wherein one substrate of said pixel array substrate and said opposing substrate of said lower left side LCD panel is an upper substrate, and the other substrate is a lower substrate, wherein said one substrate of said lower right side LCD panel is the pixel array substrate if said one substrate of said lower left side LCD panel is the pixel opposing substrate, and conversely said one substrate of said lower right side LCD panel is the opposing substrate if said one substrate of said lower left side LCD panel is the pixel array substrate;

wherein a right edge of said upper left side LCD panel is bonded to a left edge of said upper right side LCD panel, to bond said one substrate of said upper left side LCD panel and said the other substrate of said upper right side LCD panel and to bond said the other substrate of said upper left side LCD panel and said one substrate of said upper right side LCD panel, wherein a bottom edge of said upper right side LCD panel is bonded to a top edge of said lower right side LCD panel, to bond said one substrate of said upper right side LCD panel and said the other substrate of said lower right side LCD panel and to bond said the other substrate of said upper right side LCD panel and said one substrate of said lower right side LCD panel, wherein a left edge of said lower right side LCD panel is bonded to a right edge of said lower left side LCD panel, to bond said one substrate of said lower right side LCD panel and said the other substrate of said lower left side LCD panel and to bond said the other substrate of said lower right side LCD panel and said one substrate of said lower left side LCD panel, wherein a top edge of said lower left side LCD panel is bonded to a bottom edge of said upper left side LCD panel, to bond said one substrate of said lower left side LCD panel and said the other substrate of said upper left side LCD panel, and to bond said the other substrate of said lower left side LCD panel and said one substrate of said upper left side LCD panel, wherein said alignment layer on said pixel array substrate of said upper left side LCD panel is rubbed in a direction from an upper left region to a lower right region of said upper left side LCD panel, and said alignment layer on said opposing substrate of said upper left side LCD panel is rubbed in a direction from a lower left region to an upper right region, wherein said alignment layer on said pixel array substrate of said upper right side LCD panel is rubbed in a direction from an upper right region to a lower left region of said upper right side LCD panel, and said alignment layer on said opposing substrate of said upper right side LCD panel is rubbed in a direction from a lower right region to an upper left region, wherein said alignment layer on said pixel array substrate of said lower right side LCD panel is rubbed in a direction from a lower right region to an upper left region of said lower right side LCD panel, and said alignment layer on said opposing substrate of said lower right side LCD panel is rubbed in a direction from an upper right region to a lower left region, and wherein said alignment layer on said pixel array substrate of said lower left side LCD panel is rubbed in a direction from a lower left region to an upper right region of said lower left side LCD panel, and said alignment layer on said opposing substrate of said lower left side LCD panel is rubbed in a direction from an upper left area to a lower right region.

24. The LCD device according to claim 23, wherein a liquid crystal material in said upper left side LCD panel, said upper right side LCD panel, said lower right side LCD panel and said lower left side LCD panel is a nematic liquid crystal material with a chiral material causing liquid molecules to twist in a counter clockwise direction.

25. The LCD device according to claim 24, wherein a color filter is formed on said opposing substrates of said upper left side LCD panel, said upper right side LCD panel, said lower right side LCD panel and said lower left side LCD panel.

26. The LCD device according to claim 23, wherein a light source is mounted to direct the light to said lower substrates of said upper left side LCD panel, said upper right side LCD panel, said lower right side LCD panel and said lower left side LCD panel, and a diffusion plate is mounted on said upper substrates of said upper left side LCD panel, said upper right side LCD panel, said lower right side LCD panel and said lower left side LCD panel.

27. A LCD device comprising:

an upper left side LCD panel including a pixel array substrate on which a pixel array, a short ring extending along a top edge and a left edge and an alignment layer are formed, and an opposing substrate on which a common electrode and an alignment layer are formed;

an upper right side LCD panel including a pixel array substrate on which a pixel array, a short ring extending along a top edge and a right edge and an alignment layer are formed, and an opposing substrate on which a common electrode and an alignment layer are formed;

a lower right side LCD panel including a pixel array substrate on which a pixel array, a short ring extending along a bottom edge and a right edge and an alignment layer are formed, and an opposing substrate on which a common electrode and an alignment layer are formed; and a lower left side LCD panel including a pixel array substrate on which a pixel array, a short ring extending along a bottom edge and a left edge and an alignment layer are formed, and an opposing substrate on which a common electrode and an alignment layer are formed;

wherein one substrate of said pixel array substrate and said opposing substrate of said upper left side LCD panel is a lower substrate, and the other substrate is an upper substrate, wherein one substrate of said pixel array substrate and said opposing substrate of said upper right side LCD panel is an upper substrate, and the other substrate is a lower substrate, wherein said one substrate of said upper left side LCD panel is the pixel array substrate if said one substrate of said upper right side LCD panel is the opposing substrate, and conversely said one substrate of said upper left side LCD panel is the opposing substrate if said one substrate of said upper right side LCD panel is the pixel array substrate;

wherein one substrate of said pixel array substrate and said opposing substrate of said lower right side LCD panel is a lower substrate, and the other substrate is an upper substrate, wherein one substrate of said pixel array substrate and said opposing substrate of said lower left side LCD panel is an upper substrate, and the other substrate is a lower substrate, wherein said one substrate of said lower right side LCD panel is the pixel array substrate if said one substrate of said lower left side LCD is the opposing substrate, and conversely said one substrate of said lower right side LCD panel is the opposing substrate if said one substrate of said lower left side LCD is the pixel array substrate;

wherein a right edge of said upper left side LCD panel is bonded to a left edge of said upper right side LCD panel, to bond said one substrate of said upper left side LCD panel and said the other substrate of said upper right side LCD panel and to bond said the other substrate of said upper left side LCD panel and said one substrate of said upper right side LCD panel, wherein a bottom edge of said upper right side LCD panel is bonded to a top edge of said lower right side LCD panel, to bond said one substrate of said upper right side LCD panel and said the other substrate of said lower right side LCD panel and to bond said the other substrate of said upper right side LCD panel and said one substrate of said lower right side LCD panel, wherein a left edge of said lower right side LCD panel is bonded to a right edge of said lower left side LCD panel, to bond said one substrate of said lower right side LCD panel and said the other substrate of said lower left side LCD panel and to bond said the other substrate of said lower right side LCD panel and said one substrate of said lower left side LCD panel, wherein a top edge of said lower left side LCD panel is bonded to a bottom edge of said upper left side LCD panel, to bond said one substrate of said lower left side LCD panel and said the other substrate of said upper left side LCD panel and to bond said the other substrate of said lower left side LCD panel and said one substrate of said upper left side LCD panel, wherein said alignment layer on said pixel array substrate of said upper left side LCD panel is rubbed in a direction from a lower right region to an upper left region of said upper left side LCD panel, and said alignment layer on said opposing substrate of said upper left side LCD panel is rubbed in a direction from an upper right region to a lower left region, wherein said alignment layer on said pixel array substrate of said upper right side LCD panel is rubbed in a direction from a lower left region to an upper right region of said upper right side LCD panel, and said alignment layer on said opposing substrate of said upper right side LCD panel is rubbed in a direction from an upper left region to a lower right region, wherein said alignment layer on said pixel array substrate of said lower right side LCD panel is rubbed in a direction from an upper left region to a lower right region of said lower right side LCD panel, and said alignment layer on said opposing substrate of said lower right side LCD panel is rubbed in a direction from a lower left region to an upper right region, and wherein said alignment layer on said pixel array substrate of said lower left side LCD panel is rubbed in a direction from an upper right region to a lower left region of said lower left side LCD panel, and said alignment layer on said opposing substrate of said lower left side LCD panel is rubbed in a direction from a lower right region to an upper left region.

28. The LCD device according to claim 27, wherein a liquid crystal material in said upper left side LCD panel, said upper right side LCD panel, said lower right side LCD panel and said lower left side LCD panel is a nematic liquid crystal material with a chiral material causing liquid molecules to twist in a counter clockwise direction.

29. The LCD device according to claim 28, wherein a color filter is formed on said opposing substrates of said upper left side LCD panel, said upper right side LCD panel, said lower right side LCD panel and said lower left side LCD panel.

30. The LCD device according to claim 29, wherein each of said pixel arrays in said upper left side LCD panel, said upper right side LCD panel, said lower right side LCD panel and said lower left side LCD panel includes gate lines extending in parallel to said top or bottom edge, data lines extending in parallel to said left or right edge, and a pixel region formed at each of cross points of said gate lines and said data lines, wherein data line drivers are connected to said data lines on an area of said upper left side LCD panel adjacent to said top edge, and gate line drivers are connected to said gate lines on an area of said upper left side LCD panel adjacent to said left edge, wherein data line drivers are connected to said data lines on an area of said upper right side LCD panel adjacent to said top edge, and gate line drivers are connected to said gate lines on an area of said upper right side LCD panel adjacent to said right edge, wherein data line drivers are connected to said data lines on an area of said lower right side LCD panel adjacent to said bottom edge, and gate line drivers are connected to said gate lines on an area of said lower right side LCD panel adjacent to said right edge, and wherein data line drivers are connected to said data lines on an area of said lower left side LCD panel adjacent to said bottom edge, and gate line drivers are connected to said gate lines on an area of said lower left side LCD panel adjacent to said left edge.

31. A LCD device comprising:

a left side LCD panel including a pixel array substrate on which a pixel array, a short ring and an alignment layer are formed, and an opposing transparent substrate on which a common electrode and an alignment layer are formed; and a right side LCD panel including a pixel array substrate on which a pixel array, a short ring and an alignment layer are formed, and an opposing transparent substrate on which a common electrode and an alignment layer are formed;

wherein one substrate of said pixel array substrate and said opposing substrate of said left side LCD panel is a lower substrate, and the other substrate is an upper substrate, wherein one substrate of said pixel array substrate and said opposing substrate of said right side LCD panel is an upper substrate, and the other substrate is a lower substrate, wherein said one substrate of said left side LCD panel is the pixel array substrate if said one substrate of said right side LCD panel is the opposing substrate, and conversely said one substrate of said left side LCD panel is the opposing substrate if said one substrate of said right side LCD panel is the pixel array substrate;

wherein a right edge of said left side LCD panel is bonded to a left edge of said right side LCD panel, to bond said one substrate of said left side LCD panel and said the other substrate of said right side LCD panel, and to bond said the other substrate of said left side LCD panel and said one substrate of said right side LCD panel, wherein said alignment layer on said pixel array substrate of said left side LCD panel is rubbed in a direction from an upper left region to a lower right region of said left side LCD panel, and said alignment layer on said opposing substrate of said left side LCD panel is rubbed in a direction from a lower left region to an upper right region, and wherein said alignment layer on said pixel array substrate of said right side LCD panel is rubbed in a direction from a lower right region to an upper left region of said right side LCD panel, and said alignment layer on said opposing substrate of said right side LCD panel is rubbed in a direction from an upper right region to a lower left region.

32. The LCD device according to claim 31, wherein a liquid crystal material in said left side LCD panel is a nematic liquid crystal material with a chiral material causing liquid molecules to twist in a counter clockwise direction, and a liquid crystal material in said right side LCD panel is a nematic liquid crystal material with a chiral material causing liquid molecules to twist in a clockwise direction.

33. The LCD device according to claim 32, wherein a color filter is formed on said opposing substrates of said left side LCD panel and said right side LCD panel.

34. The LCD device according to claim 33, wherein said short ring on said pixel array substrate of said left side LCD panel extends along a left edge and at least one of a top edge and a bottom edge, wherein said short ring on said pixel array substrate of said right side LCD panel extends along a right edge and at least one of a top edge and a bottom edge, wherein each of said pixel arrays in said left side LCD panel and said right side LCD panel includes gate lines extending in parallel to said top or bottom edge, data lines extending in parallel to said left or right edge, and a pixel region formed at each of cross points of said gate lines and said data lines, wherein data line drivers are connected to said data lines on an area of said left side LCD panel adjacent to at least one of said top edge and said bottom edge, and gate line drivers are connected to said gate lines on an area of said left side LCD panel adjacent to said left edge, and wherein data line drivers are connected to said data lines on an area of said right side LCD panel adjacent to at least one of said top edge and said bottom edge, and gate line drivers are connected to said gate lines on an area of said right side LCD panel adjacent to said right edge.

35. A LCD device comprising:

a left side LCD panel including a pixel array substrate on which a pixel array, a short ring and an alignment layer are formed, and an opposing transparent substrate on which a common electrode and an alignment layer are formed; and a right side LCD panel including a pixel array substrate on which a pixel array, a short ring and an alignment layer are formed, and an opposing transparent substrate on which a common electrode and an alignment layer are formed;

wherein one substrate of said pixel array substrate and said opposing substrate of said left side LCD panel is a lower substrate, and the other substrate is an upper substrate, wherein one substrate of said pixel array substrate and said opposing substrate of said right side LCD panel is an upper substrate, and the other substrate is a lower substrate, wherein said one substrate of said left side LCD panel is the pixel array substrate if said one substrate of said right side LCD panel is the opposing substrate, and conversely said one substrate of said left side LCD panel is the opposing substrate if said one substrate of said right side LCD panel is the pixel array substrate;

wherein a right edge of said left side LCD panel is bonded to a left edge of said right side LCD panel, to bond said one substrate of said left side LCD panel and said the other substrate of said right side LCD panel, and to bond said the other substrate of said left side LCD panel and said one substrate of said right side LCD panel, wherein said alignment layer on said pixel array substrate of said left side LCD panel is rubbed in a direction from a lower right region to an upper left region of said left side LCD panel, and said alignment layer on said opposing substrate of said left side LCD panel is rubbed in a direction from an upper right region to a lower left region, and wherein said alignment layer on said pixel array substrate of said right side LCD panel is rubbed in a direction from an upper left region to a lower right region of said right side LCD panel, and said alignment layer on said opposing substrate of said right side LCD panel is rubbed in a direction from a lower left region to an upper right region.

36. The LCD device according to claim 35, wherein a liquid crystal material in said left side LCD panel is a nematic liquid crystal material with a chiral material causing liquid molecules to twist in a counter clockwise direction, and a liquid crystal material in said right side LCD panel is a nematic liquid crystal material with a chiral material causing liquid molecules to twist in a clockwise direction.

37. The LCD device according to claim 36, wherein a color filter is formed on said opposing substrates of said left side LCD panel and said right side LCD panel.

38. The LCD device according to claim 37, wherein said short ring on said pixel array substrate of said left side LCD panel extends along a left edge and at least one of a top edge and a bottom edge, wherein said short ring on said pixel array substrate of said right side LCD panel extends along a right edge and at least one of a top edge and a bottom edge, wherein each of said pixel arrays in said left side LCD panel and said right side LCD panel includes gate lines extending in parallel to said top or bottom edge, data lines extending in parallel to said left or right edge, and a pixel region formed at each of cross points of said gate lines and said data lines, wherein data line drivers are connected to said data lines on an area of said left side LCD panel adjacent to at least one of said top edge and said bottom edge, and gate line drivers are connected to said gate lines on an area of said left side LCD panel adjacent to said left edge, and wherein data line drivers are connected to said data lines on an area of said right side LCD panel adjacent to at least one of said top edge and said bottom edge, and gate line drivers are connected to said gate lines on an area of said right side LCD panel adjacent to said right edge.

39. A LCD device comprising:

an upper left side LCD panel including a pixel array substrate on which a pixel array, a short ring extending along a top edge and a left edge and an alignment layer are formed, and an opposing substrate on which a common electrode and an alignment layer are formed;

an upper right side LCD panel including a pixel array substrate on which a pixel array, a short ring extending along a top edge and a right edge and an alignment layer are formed, and an opposing substrate on which a common electrode and an alignment layer are formed;

a lower right side LCD panel including a pixel array substrate on which a pixel array, a short ring extending along a bottom edge and a right edge and an alignment layer are formed, and an opposing substrate on which a common electrode and an alignment layer are formed; and a lower left side LCD panel including a pixel array substrate on which a pixel array, a short ring extending along a bottom edge and a left edge and an alignment layer are formed, and an opposing substrate on which a common electrode and an alignment layer are formed;

wherein one substrate of said pixel array substrate and said opposing substrate of said upper left side LCD panel is a lower substrate, and the other substrate is an upper substrate, wherein one substrate of said pixel array substrate and said opposing substrate of said upper right side LCD panel is an upper substrate, and the other substrate is a lower substrate, wherein said one substrate of said upper left side LCD panel is the pixel array substrate if said one substrate of said upper right side LCD panel is the opposing substrate, and conversely said one substrate of said upper left side LCD panel is the opposing substrate if said one substrate of said upper right side LCD panel is the pixel array substrate;

wherein one substrate of said pixel array substrate and said opposing substrate of said lower right side LCD panel is a lower substrate, and the other substrate is an upper substrate, wherein one substrate of said pixel array substrate and said opposing substrate of said lower left side LCD panel is an upper substrate, and the other substrate is a lower substrate, wherein said one substrate of said lower right side LCD panel is the pixel array substrate if said one substrate of said lower left side LCD panel is the opposing substrate, and conversely said one substrate of said lower right side LCD panel is the opposing substrate if said one substrate of said lower left side LCD panel is the pixel array substrate;

wherein a right edge of said upper left side LCD panel is bonded to a left edge of said upper right side LCD panel, to bond said one substrate of said upper left side LCD panel and said the other substrate of said upper right side LCD panel, and to bond said the other substrate of said upper left side LCD panel and said one substrate of said upper right side LCD panel, wherein a bottom edge of said upper right side LCD panel is bonded to a top edge of said lower right side LCD panel, to bond said one substrate of said upper right side LCD panel and said the other substrate of said lower right side LCD panel, and to bond said the other substrate of said upper right side LCD panel and said one substrate of said lower right side LCD panel, wherein a left edge of said lower right side LCD panel is bonded to a right edge of said lower left side LCD panel, to bond said one substrate of said lower right side LCD panel and said the other substrate of said lower left side LCD panel, and to bond said the other substrate of said lower right side LCD panel and said one substrate of said lower left side LCD panel, wherein a top edge of said lower left side LCD panel is bonded to a bottom edge of said upper left side LCD panel, to bond said one substrate of said lower left side LCD panel and said the other substrate of said upper left side LCD panel, and to bond said the other substrate of said lower left side LCD panel and said one substrate of said upper left side LCD panel, wherein said alignment layer on said pixel array substrate of said upper left side LCD panel is rubbed in a direction from an upper left region to a lower right region of said upper left side LCD panel, and said alignment layer on said opposing substrate of said upper left side LCD panel is rubbed in a direction from a lower left region to an upper right region, wherein said alignment layer on said pixel array substrate of said upper right side LCD panel is rubbed in a direction from a lower right region to an upper left region of said upper right side LCD panel, and said alignment layer on said opposing substrate of said upper right side LCD panel is rubbed in a direction from an upper right region to a lower left region, wherein said alignment layer on said pixel array substrate of said lower right side LCD panel is rubbed in a direction from an upper right region to a lower left region of said lower right side LCD panel, and said alignment layer on said opposing substrate of said lower right side LCD panel is rubbed in a direction from a lower right region to an upper left region, and wherein said alignment layer on said pixel array substrate of said lower left side LCD panel is rubbed in a direction from a lower left region to an upper right region of said lower left side LCD panel, and said alignment layer on said opposing substrate of said lower left side LCD panel is rubbed in a direction from an upper left region to a lower right region.

40. The LCD device according to claim 39, wherein a liquid crystal material in said upper left side LCD panel and said lower left side LCD panel is a nematic liquid crystal material with a chiral material causing liquid molecules to twist in a counter clockwise direction, and a liquid crystal material in said upper right side LCD panel and said lower right side LCD panel is a nematic liquid crystal material with a chiral material causing liquid molecules to twist in a clockwise direction.

41. The LCD device according to claim 40, wherein a color filter is formed on said opposing substrates of said upper left side LCD panel, said upper right side LCD panel, said lower right side LCD panel and said lower left side LCD panel.

42. The LCD device according to claim 41, wherein each of said pixel arrays in said upper left side LCD panel, said upper right side LCD panel, said lower right side LCD panel and said lower left side LCD panel includes gate lines extending in parallel to said top or bottom edge, data lines extending in parallel to said left or right edge, and a pixel region formed at each of cross points of said gate lines and said data lines, wherein data line drivers are connected to said data lines on an area of said upper left side LCD panel adjacent to said top edge, and gate line drivers are connected to said gate lines on an area of said upper left side LCD panel adjacent to said left edge, wherein data line drivers are connected to said data lines on an area of said upper right side LCD panel adjacent to said top edge, and gate line drivers are connected to said gate lines on an area of said upper right side LCD panel adjacent to said right edge, wherein data line drivers are connected to said data lines on an area of said lower right side LCD panel adjacent to said bottom edge, and gate line drivers are connected to said gate lines on an area of said lower right side LCD panel adjacent to said right edge, and wherein data line drivers are connected to said data lines on an area of said lower left side LCD panel adjacent to said bottom edge, and gate line drivers are connected to said gate lines on an area of said lower left side LCD panel adjacent to said left edge.

43. A LCD device comprising:

an upper left side LCD panel including a pixel array substrate on which a pixel array, a short ring extending along a top edge and a left edge and an alignment layer are formed, and an opposing substrate on which a common electrode and an alignment layer are formed;

an upper right side LCD panel including a pixel array substrate on which a pixel array, a short ring extending along a top edge and a right edge and an alignment layer are formed, and an opposing substrate on which a common electrode and an alignment layer are formed;

a lower right side LCD panel including a pixel array substrate on which a pixel array, a short ring extending along a bottom edge and a right edge and an alignment layer are formed, and an opposing substrate on which a common electrode and an alignment layer are formed; and a lower left side LCD panel including a pixel array substrate on which a pixel array, a short ring extending along a bottom edge and a left edge and an alignment layer are formed, and an opposing substrate on which a common electrode and an alignment layer are formed;

wherein one substrate of said pixel array substrate and said opposing substrate of said upper left side LCD panel is a lower substrate, and the other substrate is an upper substrate, wherein one substrate of said pixel array substrate and said opposing substrate of said upper right side LCD panel is an upper substrate, and the other substrate is a lower substrate, wherein said one substrate of said upper left side LCD panel is the pixel array substrate if said one substrate of said upper right side LCD panel is the opposing substrate, and conversely said one substrate of said upper left side LCD panel is the opposing substrate if said one substrate of said upper right side LCD panel is the pixel array substrate;

wherein one substrate of said pixel array substrate and said opposing substrate of said lower right side LCD panel is a lower substrate, and the other substrate is an upper substrate, wherein one substrate of said pixel array substrate and said opposing substrate of said lower left side LCD panel is an upper substrate, and the other substrate is a lower substrate, wherein said one substrate of said lower right side LCD panel is the pixel array substrate if said one substrate of said lower left side LCD panel is the opposing substrate, and conversely said one substrate of said lower right side LCD panel is the opposing substrate if said one substrate of said lower left side LCD panel is the pixel array substrate;

wherein a right edge of said upper left side LCD panel is bonded to a left edge of said upper right side LCD panel, to bond said one substrate of said upper left side LCD panel and said the other substrate of said upper right side LCD panel, and to bond said the other substrate of said upper left side LCD panel and said one substrate of said upper right side LCD panel, wherein a bottom edge of said upper right side LCD panel is bonded to a top edge of said lower right side LCD panel, to bond said one substrate of said upper right side LCD panel and said the other substrate of said lower right side LCD panel, and to bond said the other substrate of said upper right side LCD panel and said one substrate of said lower right side LCD panel, wherein a left edge of said lower right side LCD panel is bonded to a right edge of said lower left side LCD panel, to bond said one substrate of said lower right side LCD panel and said the other substrate of said lower left side LCD panel, and to bond said the other substrate of said lower right side LCD panel and said one substrate of said lower left side LCD panel, wherein a top edge of said lower left side LCD panel is bonded to a bottom edge of said upper left side LCD panel, to bond said one substrate of said lower left side LCD panel and said the other substrate of said upper left side LCD panel, and to bond said the other substrate of said lower left side LCD panel and said one substrate of said upper left side LCD panel, wherein said alignment layer on said pixel array substrate of said upper left side LCD panel is rubbed in a direction from a lower right region to an upper left region of said upper left side LCD panel, and said alignment layer on said opposing substrate of said upper left side LCD panel is rubbed in a direction from an upper right region to a lower left region, wherein said alignment layer on said pixel array substrate of said upper right side LCD panel is rubbed in a direction from an upper left region to a lower right region of said upper right side LCD panel, and said alignment layer on said opposing substrate of said upper right side LCD panel is rubbed in a direction from a lower left region to an upper right region, wherein said alignment layer on said pixel array substrate of said lower right side LCD panel is rubbed in a direction from a lower left region to an upper right region of said lower right side LCD panel, and said alignment layer on said opposing substrate of said lower right side LCD panel is rubbed in a direction from an upper left region to a lower right region, and wherein said alignment layer on said pixel array substrate of said lower left side LCD panel is rubbed in a direction from an upper right region to a lower left region of said lower left side LCD panel, and said alignment layer on said opposing substrate of said lower left side LCD panel is rubbed in a direction from a lower right region to an upper left region.

44. The LCD device according to claim 43, wherein a liquid crystal material in said upper left side LCD panel and said lower left side LCD panel is a nematic liquid crystal material with a chiral material causing liquid molecules to twist in a counter clockwise direction, and a liquid crystal material in said upper right side LCD panel and said lower right side LCD panel is a nematic liquid crystal material with a chiral material causing liquid molecules to twist in a clockwise direction.

45. The LCD device according to claim 44, wherein a color filter is formed on said opposing substrates of said upper left side LCD panel, said upper right side LCD panel, said lower right side LCD panel and said lower left side LCD panel.

46. The LCD device according to claim 45, wherein each of said pixel arrays in said upper left side LCD panel, said upper right side LCD panel, said lower right side LCD panel and said lower left side LCD panel includes gate lines extending in parallel to said top or bottom edge, data lines extending in parallel to said left or right edge, and a pixel region formed at each of cross points of said gate lines and said data lines, wherein data line drivers are connected to said data lines on an area of said upper left side LCD panel adjacent to said top edge, and gate line drivers are connected to said gate lines on an area of said upper left side LCD panel adjacent to said left edge, wherein data line drivers are connected to said data lines on an area of said upper right side LCD panel adjacent to said top edge, and gate line drivers are connected to said gate lines on an area of said upper right side LCD panel adjacent to said right edge, wherein data line drivers are connected to said data lines on an area of said lower right side LCD panel adjacent to said bottom edge, and gate line drivers are connected to said gate lines on an area of said lower right side LCD panel adjacent to said right edge, and wherein data line drivers are connected to said data lines on an area of said lower left side LCD panel adjacent to said bottom edge, and gate line drivers are connected to said gate lines on an area of said lower left side LCD panel adjacent to said left edge.

* * * * *

UNITED STATES PATENT AND TRADEMARK OFFICE
CERTIFICATE OF CORRECTION

PATENT NO. : 6,515,723 B1
DATED : February 4, 2003
INVENTOR(S) : Shunji Suzuki

It is certified that error appears in the above-identified patent and that said Letters Patent is hereby corrected as shown below:

<u>Column 6,</u>
Line 58, "cand" should read -- and --

<u>Column 7,</u>
Line 60, "lower left side" should read -- lower right side --

<u>Column 10,</u>
Line 24, "CD" should read -- LCD --

<u>Column 23,</u>
Line 65, "Red" should read -- Blue --

<u>Column 28,</u>
Line 65, "substrate 51" should read -- substrate 42 --

<u>Column 35,</u>
Line 23, "said lower left side" should read -- said lower right side --

Signed and Sealed this

Seventh Day of October, 2003

JAMES E. ROGAN
*Director of the United States Patent and Trademark Office*